US010546408B2

(12) United States Patent
Yang et al.

(10) Patent No.: US 10,546,408 B2
(45) Date of Patent: Jan. 28, 2020

(54) RETARGETING SKELETON MOTION SEQUENCES THROUGH CYCLE CONSISTENCY ADVERSARIAL TRAINING OF A MOTION SYNTHESIS NEURAL NETWORK WITH A FORWARD KINEMATICS LAYER

(71) Applicant: Adobe Inc., San Jose, CA (US)

(72) Inventors: Jimei Yang, Merced, CA (US); Duygu Ceylan, Mountain View, CA (US); Ruben Villegas, Ann Arbor, MI (US)

(73) Assignee: Adobe Inc., San Jose, CA (US)

(*) Notice: Subject to any disclaimer, the term of this patent is extended or adjusted under 35 U.S.C. 154(b) by 8 days.

(21) Appl. No.: 15/926,787

(22) Filed: Mar. 20, 2018

(65) Prior Publication Data

US 2019/0295305 A1 Sep. 26, 2019

(51) Int. Cl.
*G06T 15/00* (2011.01)
*G06T 13/40* (2011.01)
*G06N 3/04* (2006.01)
*G06N 3/08* (2006.01)

(52) U.S. Cl.
CPC .......... *G06T 13/40* (2013.01); *G06N 3/0445* (2013.01); *G06N 3/0454* (2013.01); *G06N 3/08* (2013.01); *G06T 2207/20084* (2013.01); *G06T 2213/12* (2013.01)

(58) Field of Classification Search
CPC ....... G06T 15/00; G06T 13/00; A63F 13/577; A63F 13/213; A63F 13/428; G06N 99/005
USPC ........................................................ 345/418
See application file for complete search history.

(56) References Cited

U.S. PATENT DOCUMENTS

| 6,552,729 B1* | 4/2003 | Di Bernardo ........... G06T 13/20 345/473 |
| 7,024,276 B2* | 4/2006 | Ito ............................ B25J 9/163 318/568.1 |
| 8,224,652 B2* | 7/2012 | Wang .................... G06T 13/205 704/260 |

(Continued)

OTHER PUBLICATIONS

Mueller F, Bernard F, Sotnychenko O, Mehta D, Sridhar S, Casas D, Theobalt C. GANerated Hands for Real-time 3D Hand Tracking from Monocular RGB. arXiv preprint arXiv:1712.01057. Dec. 4, 2017.*

(Continued)

*Primary Examiner* — Phu K Nguyen
(74) *Attorney, Agent, or Firm* — Keller Jolley Preece

(57) ABSTRACT

This disclosure relates to methods, non-transitory computer readable media, and systems that use a motion synthesis neural network with a forward kinematics layer to generate a motion sequence for a target skeleton based on an initial motion sequence for an initial skeleton. In certain embodiments, the methods, non-transitory computer readable media, and systems use a motion synthesis neural network comprising an encoder recurrent neural network, a decoder recurrent neural network, and a forward kinematics layer to retarget motion sequences. To train the motion synthesis neural network to retarget such motion sequences, in some implementations, the disclosed methods, non-transitory computer readable media, and systems modify parameters of the motion synthesis neural network based on one or both of an adversarial loss and a cycle consistency loss.

20 Claims, 13 Drawing Sheets

(56) References Cited

U.S. PATENT DOCUMENTS

| | | | | |
|---|---|---|---|---|
| 8,228,336 B1* | 7/2012 | Dykes | ............... | G06T 13/40 |
| | | | | 345/473 |
| 8,665,277 B1* | 3/2014 | Dykes | ............... | G06T 13/40 |
| | | | | 345/473 |
| 9,147,166 B1* | 9/2015 | Drame | ............... | G06N 20/00 |
| 9,827,496 B1* | 11/2017 | Zinno | ............... | A63F 13/577 |

OTHER PUBLICATIONS

Villegas R, Yang J, Ceylan D, Lee H. Neural Kinematic Networks for Unsupervised Motion Retargetting. arXiv preprint arXiv: 1804.05653. Apr. 16, 2018.*

Dehghani M, Ahmadi M, Khayatian A, Eghtesad M, Farid M. Neural network solution for forward kinematics problem of HEXA parallel robot. In2008 American Control Conference Jun. 11, 2008 (pp. 4214-4219). IEEE.*

Ghasemi A, Eghtesad M, Farid M. Neural network solution for forward kinematics problem of cable robots. Journal of Intelligent & Robotic Systems. Nov. 1, 2010;60(2):201-15.*

Adobe's Mixamo. https://www.mixamo.com. Accessed: Sep. 28, 2017.

K. Ayusawa and E. Yoshida. Motion retargeting for humanoid robots based on simultaneous morphing parameter identification and motion optimization. IEEE Trans. on Robotics, 33(6), 2017. to appear.

J. A. D. Bagnell. An invitation to imitation. Technical Report CMU-RI-TR-15-08, Pittsburgh, PA, Mar. 2015.

Blender Online Community. Blender—a 3D modelling and rendering package. Blender Foundation, Blender Institute, Amsterdam, 2017.

J. Bütepage, M. Black, D. Kragic, and H. Kjellström. Deep representation learning for human motion prediction and classification. arXiv preprint arXiv:1702.07486, 2017.

K.-J. Choi and H.-S. Ko. Online motion retargetting. In Pacific Graphics. 1999.

K. Fragkiadaki, S. Levine, P. Felsen, and J. Malik. Recurrent network models for human dynamics. In Proceedings of the IEEE International Conference on Computer Vision, pp. 4346-4354, 2015.

M. Gleicher. Retargetting motion to new characters. In SIGGRAPH. 1998.

I. Goodfellow, J. Pouget-Abadie, M. Mirza, B. Xu, D. Warde-Farley, S. Ozair, A. Courville, and Y. Bengio. Generative adversarial nets. In NIPS. 2014.

A. Graves, A.-r. Mohamed, and G. Hinton. Speech recognition with deep recurrent neural networks. In Acoustics, speech and signal processing (icassp), 2013 ieee international conference on, pp. 6645-6649. IEEE, 2013.

G. B. Hammam, P. M. Wensing, B. Dariush, and D. E. Orin. Kinodynamically consistent motion retargeting for humanoids. In IJHR. 2015.

J. Ho and S. Ermon. Generative adversarial imitation learning. In Advances in Neural Information Processing Systems, pp. 4565-4573, 2016.

D. Holden, J. Saito, and T. Komura. A deep learning framework for character motion synthesis and editing. In SIGGRAPH. 2016.

C. Ionescu, D. Papava, V. Olaru, and C. Sminchisescu. Human3.6M: Large scale datasets and predictive methods for 3D human sensing in natural environments. PAMI, 36(7):1325-1339, 2014.

M. Johnson, M. Schuster, Q. V. Le, M. Krikun, Y. Wu, Z. Chen, N. Thorat, F. Viégas, M. Wattenberg, G. Corrado, et al. Google's multilingual neural machine translation system: enabling zero-shot translation. arXiv preprint arXiv:1611.04558, 2016.

J. Martinez, R. Hossain, J. Romero, and J. J. Little. A simple yet effective baseline for 3d human pose. ICCV, 2017.

D. Mehta, S. Sridhar, O. Sotnychenko, H. Rhodin, M. Shafiei, H.-P. Seidel, W. Xu, D. Casas, and C. Theobalt. Vnect: Realtime 3d human pose estimation with a single rgb camera. arXiv preprint arXiv:1705.01583, 2017.

J. Merel, Y. Tassa, S. Srinivasan, J. Lemmon, Z. Wang, G. Wayne, and N. Heess. Learning human behaviors from motion capture by adversarial imitation. arXiv preprint arXiv:1707.02201, 2017.

S. Schaal. Is imitation learning the route to humanoid robots? Trends in cognitive sciences, 3(6):233-242, 1999.

P. Sermanet, C. Lynch, J. Hsu, and S. Levine. Time contrastive networks: Self-supervised learning from multiview observation. 2017.

A. Shon, K. Grochow, A. Hertzmann, and R. P. Rao. Learning shared latent structure for image synthesis and robotic imitation. In Y. Weiss, P. B. Schölkopf, and J. C. Platt, editors, Advances in Neural Information Processing Systems 18, pp. 1233-1240. MIT Press, 2006.

G. W. Taylor, G. E. Hinton, and S. T. Roweis. Modeling human motion using binary latent variables. In Advances in neural information processing systems, pp. 1345-1352, 2007.

J. M. Wang, D. J. Fleet, and A. Hertzmann. Gaussian process dynamical models for human motion. IEEE transactions on pattern analysis and machine intelligence, 30(2):283-298, 2008.

T. Zhou, P. Krahenbuhl, M. Aubry, Q. Huang, and A. A. Efros. Learning dense correspondence via 3d-guided cycle consistency. In Proceedings of the IEEE Conference on Computer Vision and Pattern Recognition, pp. 117-126, 2016.

J.-Y. Zhu, T. Park, P. Isola, and A. A. Efros. Unpaired imageto— image translation using cycle-consistent adversarial networks. arXiv preprint arXiv:1703.10593, 2017.

* cited by examiner

RETARGETING SKELETON MOTION SEQUENCES THROUGH CYCLE CONSISTENCY ADVERSARIAL TRAINING OF A MOTION SYNTHESIS NEURAL NETWORK WITH A FORWARD KINEMATICS LAYER

BACKGROUND

Computer animators increasingly use computer-modeling techniques to generate models of three-dimensional objects for computer-generated imagery. In some cases, computing devices use computer-modeling techniques to retarget (or transfer) a motion performed by a three-dimensional object's digital skeleton to a different three-dimensional object's digital skeleton. For example, some existing computer-modeling techniques retarget a motion performed by one humanoid digital skeleton to another humanoid digital skeleton using damped-least-square methods for inverse kinematics.

Despite making advances in retargeting motion, existing computer-modeling systems have a number of shortcomings. In particular, conventional computer-modeling systems are often inaccurate (e.g., unrealistic), inefficient, and inflexible. For example, some conventional computer-modeling systems require post-processing adjustments to retarget a motion performed by a skeleton. For example, some existing computer-modeling systems directly map coordinates for joints of a source skeleton to joints of a standard skeleton in a pre-processing stage. Such mapping assumes that the positions of end-effectors of both the source and standard skeletons (e.g., a hand or foot of a humanoid) are in the same position or that the segments between joints of both skeletons are the same length. Such a rigid approach limits conventional systems to retargeting motion between skeletons of the same size and/or introduces inaccuracies in modeling motion across different skeletons.

By contrast, some existing computer-modeling systems iteratively optimize a machine-learning model with hand-designed objectives for end-effectors to preserve the essence of a motion retargeted from one skeleton to another skeleton. For instance, the machine-learning model may adjust the position of end-effectors based on an algorithm or design from a computer animator. But such machine-learning models rely on humans to discover properties of a motion and transfer such properties from one skeleton to another. By relying on humans, such supervised machines often introduce inaccuracies and fail to identify important features of a motion or skeleton when retargeting a motion between different skeletons.

Because existing computer-modeling systems lack the technology to accurately retarget a motion between different skeletons, existing computer-modeling techniques often provide a tedious and user-intensive process. These computer-modeling techniques prompt computer animators to use individual editing tools to modify joint positions or joint rotations to match a source motion. In such cases, the additional user input for joint position and rotation adjustments further consumes computer-processing capacity and time.

In addition to the inaccuracies and inefficiencies of some existing machine-learning techniques to retarget motion, training a machine-learning model to retarget a motion can be expensive and unreliable. Data sets with a ground truth for a retargeted motion on a different skeleton are limited and difficult for computer animators to generate. Paired motion data for different skeletons (e.g., features for different skeletons performing the same motion) are difficult to find or generate, which undermines the feasibility and reliability of such machine-learning approaches.

SUMMARY

This disclosure describes one or more embodiments of methods, non-transitory computer readable media, and systems that solve the foregoing problems in addition to providing other benefits. For example, in one or more embodiments, the disclosed systems use a neural network with a forward kinematics layer to generate a motion sequence for a target skeleton based on an initial motion sequence for an initial skeleton. Specifically, in certain embodiments the systems use a motion synthesis neural network comprising an encoder recurrent neural network, a decoder recurrent neural network, and a forward kinematics layer to retarget motion sequences. To train the motion synthesis neural network to retarget such motion sequences, in some implementations, the disclosed systems modify parameters of the motion synthesis neural network based on one or both of an adversarial loss and a cycle consistency loss.

For instance, in some embodiments, the disclosed systems provide training input joint features of a training initial skeleton to a motion synthesis neural network, where the training input joint features correspond to an initial time of a training motion sequence. Based on the training input joint features, an encoder recurrent neural network and a decoder recurrent neural network generate predicted joint rotations for a training target skeleton for an initial time of a training target motion sequence. From the predicted joint rotations, a forward kinematics layer generates predicted joint features of the training target skeleton for the initial time of the training target motion sequence. Based on the predicted joint features of the training target skeleton, the systems train the motion synthesis neural network to generate target skeleton motion sequences from initial skeleton motion sequences. In addition to training the motion synthesis neural network, in certain embodiments, the systems use the motion synthesis neural network to generate a target motion sequence from an initial motion sequence.

BRIEF DESCRIPTION OF THE DRAWINGS

The detailed description refers to the drawings briefly described below.

DETAILED DESCRIPTION

Figure 1:
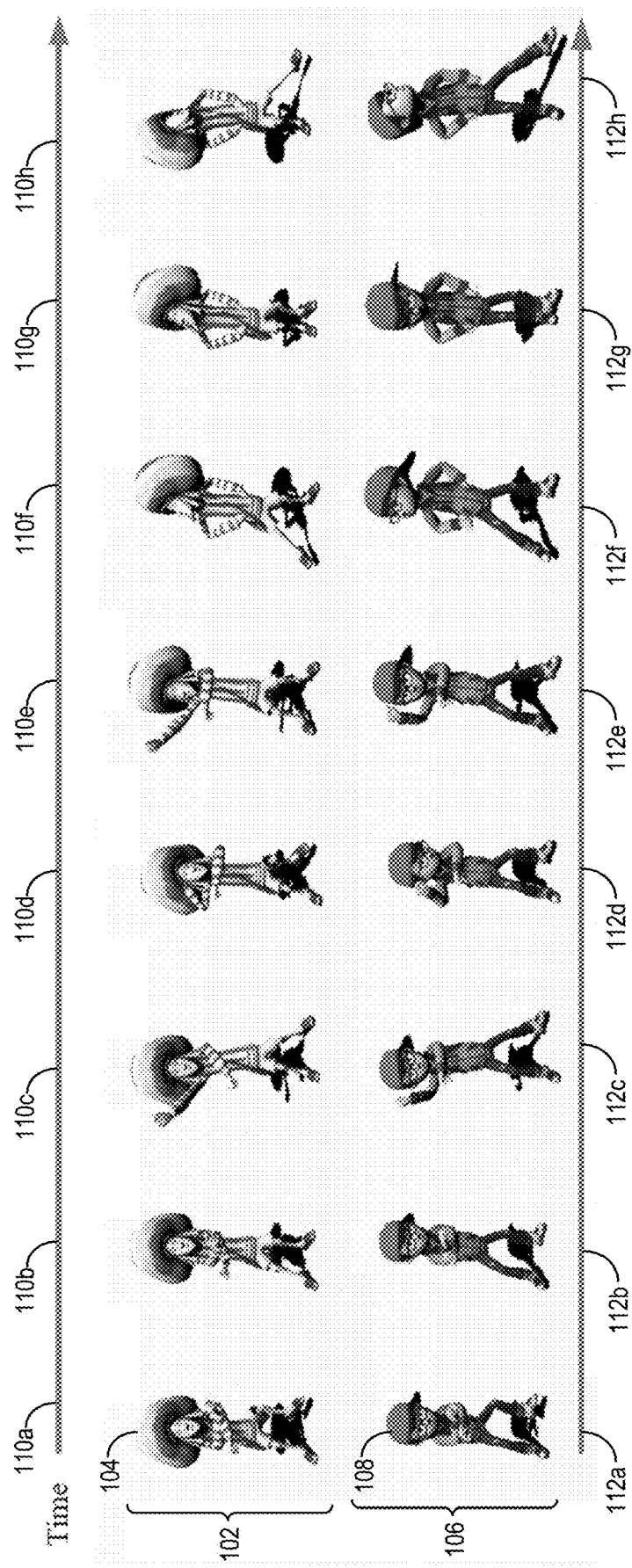
FIG. 1 illustrates a retargeted motion system generating and rendering a target skeleton motion sequence from an initial skeleton motion sequence in accordance with one or more embodiments.

This disclosure describes one or more embodiments of a retargeted motion system that uses a forward kinematics layer within a neural network to generate a target motion sequence for a target skeleton based on a motion sequence for an initial skeleton. As part of retargeting such a motion sequence, the retargeted motion system can generate multiple joint features for particular times of a target motion sequence. To generate such joint features, in certain embodiments, the retargeted motion system uses a motion synthesis neural network comprising an encoder recurrent neural network ("encoder RNN"), a decoder recurrent neural network ("decoder RNN"), and a forward kinematics layer. When training the motion synthesis neural network to retarget motion sequences, in some implementations, the retargeted motion system modifies parameters of the motion synthesis neural network based on one or both of an adversarial loss and a cycle consistency loss.

For instance, in some embodiments, the retargeted motion system provides training input joint features of a training initial skeleton to a motion synthesis neural network, where the training input joint features correspond to an initial time of a training motion sequence. Based on the training input joint features, an encoder RNN and a decoder RNN generate predicted joint rotations for a training target skeleton for an initial time of a training target motion sequence. From the predicted joint rotations, a forward kinematics layer generates predicted joint features of the training target skeleton for the initial time of the training target motion sequence. Based on the predicted joint features of the training target skeleton, the retargeted motion system trains the motion synthesis neural network to generate target skeleton motion sequences from initial skeleton motion sequences.

In addition to training the motion synthesis neural network, the retargeted motion system can also use the motion synthesis neural network to generate a target motion sequence from an initial motion sequence. For example, in some embodiments, the retargeted motion system inputs initial joint features of an initial skeleton into a trained motion synthesis neural network, where the initial joint features correspond to an initial time of a motion sequence. Based on the initial joint features, an encoder RNN and a decoder RNN generate predicted joint rotations of a target skeleton for an initial time of a target motion sequence. From the predicted joint rotations, the forward kinematics layer generates predicted joint features of the target skeleton for the initial time of the target motion sequence. Based on the predicted joint features, the retargeted motion system renders an animated object performing the target motion sequence of the target skeleton corresponding to the motion sequence of the initial skeleton.

As just mentioned, the retargeted motion system provides training input joint features to a motion synthesis neural network during a training process. When providing such features, in certain embodiments, the retargeted motion system provides training input joint features of a training initial skeleton in multiple time cycles, where the training input joint features correspond to multiple times of a training motion sequence. As part of such training time cycles, the forward kinematics layer generates predicted joint features of the training target skeleton that each correspond to a particular time of a training target motion sequence. In certain embodiments, the training input joint features comprise positions for joints of the training initial skeleton and global-motion parameters for a root joint of the training initial skeleton. Similarly, the predicted joint features may comprise positions for joints of the training target skeleton and global-motion parameters for a root joint of the training target skeleton.

As part of generating predicted joint features of a training target skeleton, the retargeted motion system uses a forward kinematics layer to apply rotations to joints of the training target skeleton. In some embodiments, for example, the forward kinematics layer applies a predicted rotation matrix to each joint of a target skeleton to generate the predicted joint features. Because the retargeted motion system may operate iteratively, in certain implementations, the forward kinematics layer applies rotation matrices and generates joint features corresponding to each time (e.g., each frame) within a training target motion sequence.

In addition to generating predicted joint features, in certain embodiments, the retargeted motion system trains the motion synthesis neural network using a loss function. In particular, in one or more embodiments, the retargeted motion system trains the motion synthesis neural network using an adversarial loss. For example, in certain embodiments, the retargeted motion system inputs predicted joint features of a training target skeleton into a discriminator neural network, where the predicted joint features correspond to a particular time of a training motion sequence. The retargeted motion system then uses the discriminator neural network to generate a realism score for the predicted joint features and determines an adversarial loss based on the realism score.

Similarly, in certain embodiments, the retargeted motion system provides training input joint features of a training initial skeleton to a discriminator neural network, where the training input joint features correspond to a particular time of a training motion sequence. The retargeted motion system then uses the discriminator neural network to generate an additional realism score for the training input joint features and determines the adversarial loss based on both the realism score for the predicted joint features and the realism score for the training input joint features.

By using the realism scores and the adversarial loss, the retargeted motion system trains the motion synthesis system to generate predicted joint features that resemble realistic training input joint features. To accomplish such an objective, in certain embodiments, the retargeted motion system (i) modifies parameters of the motion synthesis neural network to increase an adversarial loss and (ii) modifies parameters of the discriminator neural network to decrease the adversarial loss.

In addition (or in the alternative) to using adversarial loss, in certain embodiments, the retargeted motion system trains the motion synthesis neural network using a cycle consistency loss. For example, in certain embodiments, the retargeted motion system inputs predicted joint features of a training target skeleton into a motion synthesis neural network, where the predicted joint features correspond to a particular time of the training target motion sequence. The retargeted motion system then generates consistency joint features of the training initial skeleton for a corresponding time of the training motion sequence. The retargeted motion system can then determine a cycle consistency loss by comparing the consistency joint features of the training initial skeleton with the training input joint features of the training initial skeleton.

The retargeted motion system can use the cycle consistency loss to train the motion synthesis neural network to generate more accurate joint features (and retargeted motion sequences for animated objects). In some embodiments, for example, the retargeted motion system modifies parameters of the motion synthesis neural network based on the cycle consistency loss. Additionally, in certain implementations, the retargeted motion system modifies parameters of the motion synthesis neural network based on both an adversarial loss and a cycle consistency loss.

As suggested above, in addition (or in the alternative) to training a motion synthesis neural network, the retargeted motion system uses a motion synthesis neural network to generate a target motion sequence from an initial motion sequence. In some embodiments, for example, the retargeted motion system iteratively inputs initial joint features of an initial skeleton into the motion synthesis neural network, where the initial joint features each correspond to a particular time of a motion sequence. As for output, the motion synthesis neural network can generate predicted joint features of a target skeleton, where each of the predicted joint features correspond to a particular time of a target motion sequence. In some such embodiments, the initial joint features comprise positions for joints of an initial skeleton and global-motion parameters for a root joint of the initial skeleton. Similarly, the predicted joint features comprise positions for joints of a target skeleton and global-motion parameters for a root joint of the target skeleton.

By using a forward kinematics layer within a neural network architecture, the motion synthesis neural network can retarget a motion sequence from an initial skeleton to a target skeleton that differs from the initial skeleton. For example, in some embodiments, the initial skeleton includes a segment in between joints that differs in length and/or proportion from a corresponding segment in between joints of the target skeleton. The initial skeleton may have multiple such segments that differ in length and proportion from corresponding segments of the target skeleton. Despite such differences, the retargeted motion system generates a target motion sequence for the target skeleton that accurately mimics an initial motion sequence for the initial skeleton.

The disclosed retargeted motion system overcomes several technical deficiencies that hinder existing computer-modeling systems. For example, the retargeted motion system improves the accuracy and efficiency with which a neural network retargets a motion sequence from one skeleton to a different sized skeleton. Some existing computer-modeling systems require human animators to adjust a motion sequence that a neural network has retargeted to a different sized skeleton. By contrast, in some embodiments, the disclosed retargeted motion system uses a forward kinematics layer with an RNN encoder-decoder to generate joint features that reflect a target skeleton's differing structure. By implementing a unique neural network architecture, the retargeted motion system retargets motion sequences with an accuracy that previously could only be performed by human animators through a tedious, inefficient process. In some implementations, the disclosed retargeted motion system provides an end-to-end solution to retargeting motion that can improve the efficiency of conventional systems and reduce or eliminate the need for post-processing adjustments from human animators.

In addition, the disclosed retargeted motion system also flexibly generates realistic target motion sequences that reflect initial motion sequences. Unlike existing computer-modeling techniques that fail to adjust to different sized target skeletons, in certain implementations, the retargeted motion system can generate predicted joint rotations and predicted joint features compatible with the joints and segments of a different-sized target skeleton. Without features compatible with the joints and segments of a target skeleton, existing computer-modeling systems may generate an unrealistic version of a retargeted motion sequence. But by generating predicted joint features adjusted to the structure of the target skeleton, the retargeted motion system flexibly generates a target motion sequence that more realistically resembles how an animated object with the target skeleton would perform a retargeted motion sequence.

As suggested above, the retargeted motion system also provides an expedited method of retargeting a motion sequence for application online. Because the retargeted motion system analyzes initial joint features corresponding to times within a motion sequence, the system can analyze motion sequences transmitted over the Internet or other networks as data for joint features arrive. As the retargeted motion system receives data corresponding to different frames of a motion sequence, the system iteratively generates predicted joint features corresponding to particular times of a target motion sequence. Accordingly, the retargeted motion system can perform online motion retargeting on the fly as it receives new frames for the input motion sequence.

Additionally, in certain embodiments, the retargeted motion system avoids the expense, inefficiencies, and unreliability of generating ground-truth joint features for one skeleton to mimic the motion sequence of a different sized skeleton. As an alternative to using paired motion data for different sized skeletons, the retargeted motion system can use one or both of a cycle consistency loss and an adversarial loss to modify parameters of a motion synthesis neural network. Both a cycle consistency loss and an adversarial loss provide training signals for the retargeted motion system that resemble (and serve as a substitute for) the training signals from a loss determined by a comparison of a ground truth motion sequence and a predicted motion sequence. In short, the retargeted motion system utilizes unique unsupervised learning approaches to reduce inefficiencies of supervised machine-learning techniques.

Turning now to FIG. 1, this figure depicts a retargeted motion system generating and rendering a target motion sequence 106 of a target skeleton based on a motion sequence 102 of an initial skeleton in accordance with one or more embodiments. As shown in FIG. 1, an animated character 104 performs the motion sequence 102 with a skin or mesh corresponding to an initial skeleton. Although not shown, the initial skeleton represents a scaffolding (e.g., joints and connecting members) for the skin or mesh depicted for the animated character 104. Similarly, an animated character 108 performs the target motion sequence 106 with a skin or mesh corresponding to a target skeleton. The retargeted motion system uses a motion synthesis neural network to retarget (or transfer) the motion sequence 102 from the initial skeleton to the target skeleton in the form of the target motion sequence 106.

As used in this disclosure, the term "motion sequence" refers to a series of positions (and/or movements) for an object that together resemble a motion, such as positions for an animated humanoid or other animated thing with an underlying skeleton. In some embodiments, the term "motion sequence" refers to a series of positions, velocities, and rotations for joints of a skeleton over time that together resemble a motion. For example, a motion sequence can include a plurality of frames (e.g., still frames) portraying an object in a plurality of positions at a plurality of times. This disclosure uses the term "target motion sequence" to refer to a motion sequence generated for a target skeleton that resembles or reflects a source motion sequence for an initial skeleton (e.g., mimics an initial motion sequence).

As shown in FIG. 1, for instance, the retargeted motion system renders the animated character 104 performing the motion sequence 102 by rendering the initial skeleton and its overlying mesh in different positions in a particular order. As indicated in FIG. 1, each position corresponds to times 110a-110h of the motion sequence 102. While the motion sequence 102 comprises a series of joint features corresponding to the times 110a-110h, the retargeted motion system can render the motion sequence 102 in animated form as shown in FIG. 1.

Relatedly, the term "skeleton" refers to a virtual (or digital) armature or virtual (or digital) rig. For example, in some embodiments, the term "skeleton" refers to a collection of virtual segments connected by joints that together form a virtual armature or rig. In some embodiments, a skeleton comprises a series of joints and joint chains with hierarchal relationships, such as parent joints that affect the placement of child joints. Accordingly, a moveable object can be presented digitally as a series of joints and connecting segments that collectively form a skeleton. This disclosure uses the term "initial skeleton" to refer to a skeleton that corresponds to a motion sequence the retargeted motion system retargets (or transfers) to another skeleton. By contrast, this disclosure uses the term "target skeleton" to refer to a skeleton for which a motion sequence is generated or retargeted. The target skeleton is the target object for an initial motion sequence. Accordingly, a target skeleton corresponds to a target motion sequence.

As the term "skeleton" implies, the bones and joints of a humanoid skeleton resemble the bones and joints of a human. While FIG. 1 depicts an animated character with a humanoid skeleton, the retargeted motion system may use or retarget motion sequences for skeletons of any type of articulated object, such as, but not limited to, animated animals, furniture, humanoids, instruments, plants, machines, toys, or vehicles. As the animated characters 104 and 108 suggest, skeletons may include segments and joints that differ in length and proportion from other skeletons. But the retargeted motion system can generate a target motion sequence based on a motion sequence when the initial skeleton comprises a segment in between joints that differs in length and/or proportion from a corresponding segment in between joints of a target skeleton.

To generate a target motion sequence, in some embodiments, the retargeted motion system inputs initial joint features of an initial skeleton into a motion synthesis neural network that generates predicted joint features of a target skeleton. As used in this disclosure, the term "joint features" refers to characteristics for joints of a skeleton. In some embodiments, the term "joint features" refers to positions and movements for joints of a skeleton corresponding to a particular time of a motion sequence. For example, joint features may include positions for joints of a skeleton with respect to a root joint and global-motion parameters for the root joint of a skeleton.

Relatedly, the term "global-motion parameters" refers to velocities and rotation of a skeleton's root joint. In some embodiments, for example, the term "global-motion parameters" refers to velocities in three dimensions (x, y, and z directions) and a rotation of a skeleton's root joint with respect to an axis perpendicular to the ground. But the global-motion parameters may use other velocities or rotations. For example, in some embodiments, the rotation of a skeleton's root joint may be around an axis vertical to the ground. As used in this disclosure, the term "root joint" refers to a joint within a skeleton that functions as a reference for other joints within the skeleton. In particular, the term "root joint" refers to a joint within a skeleton having a higher position of hierarchy than all other joints within the skeleton's hierarchy. For example, in a humanoid skeleton, a root joint may be located at or near a center of a pelvis or located at or near an intersection of two hips.

In certain embodiments, joint features correspond to a time for a motion sequence. In FIG. 1, for example, the motion sequence 102 includes a joint-feature set for each of the times 110a-110h of the motion sequence 102. Similarly, the target motion sequence 106 includes a joint-feature set for each of the times 112a-112h of the target motion sequence 106. As FIG. 1 suggests, the joint-feature set for the time 110a of the motion sequence 102 corresponds to the joint-feature set for the time 112a of the target motion sequence 106. But the joint-feature sets for the times 110a and 112a also differ because the initial skeleton for the animated character 104 and the target skeleton for the animated character 108 comprise some segments between joints that differ in length and proportion.

To retarget the motion sequence 102 from the initial skeleton to the target skeleton, the retargeted motion system inputs initial joint features of the initial skeleton for the animated character 104 into a motion synthesis neural network. As used in this disclosure, the term "neural network" refers to a machine learning model that can be tuned (e.g., trained) based on training input to approximate unknown functions. In particular, the term "neural network" can include a model of interconnected digital neurons that communicate and learn to approximate complex functions and generate outputs based on a plurality of inputs provided to the model. A neural network includes an algorithm that implements deep learning techniques, that is, machine learning that utilizes a set of algorithms to attempt to model high-level abstractions in data.

Figure 3A:
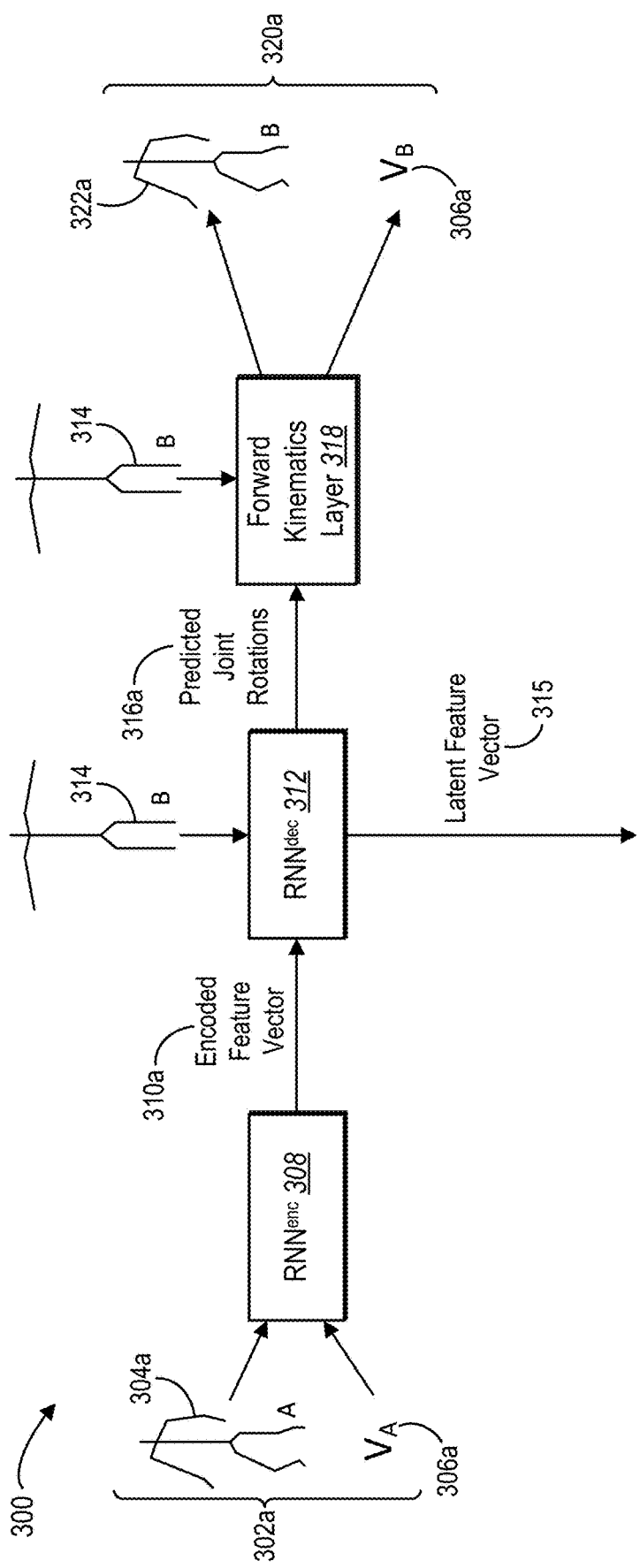
FIG. 3A illustrates a motion synthesis neural network generating predicted joint features of a training target skeleton for an initial time of a training target motion sequence in accordance with one or more embodiments.
Figure 3B:
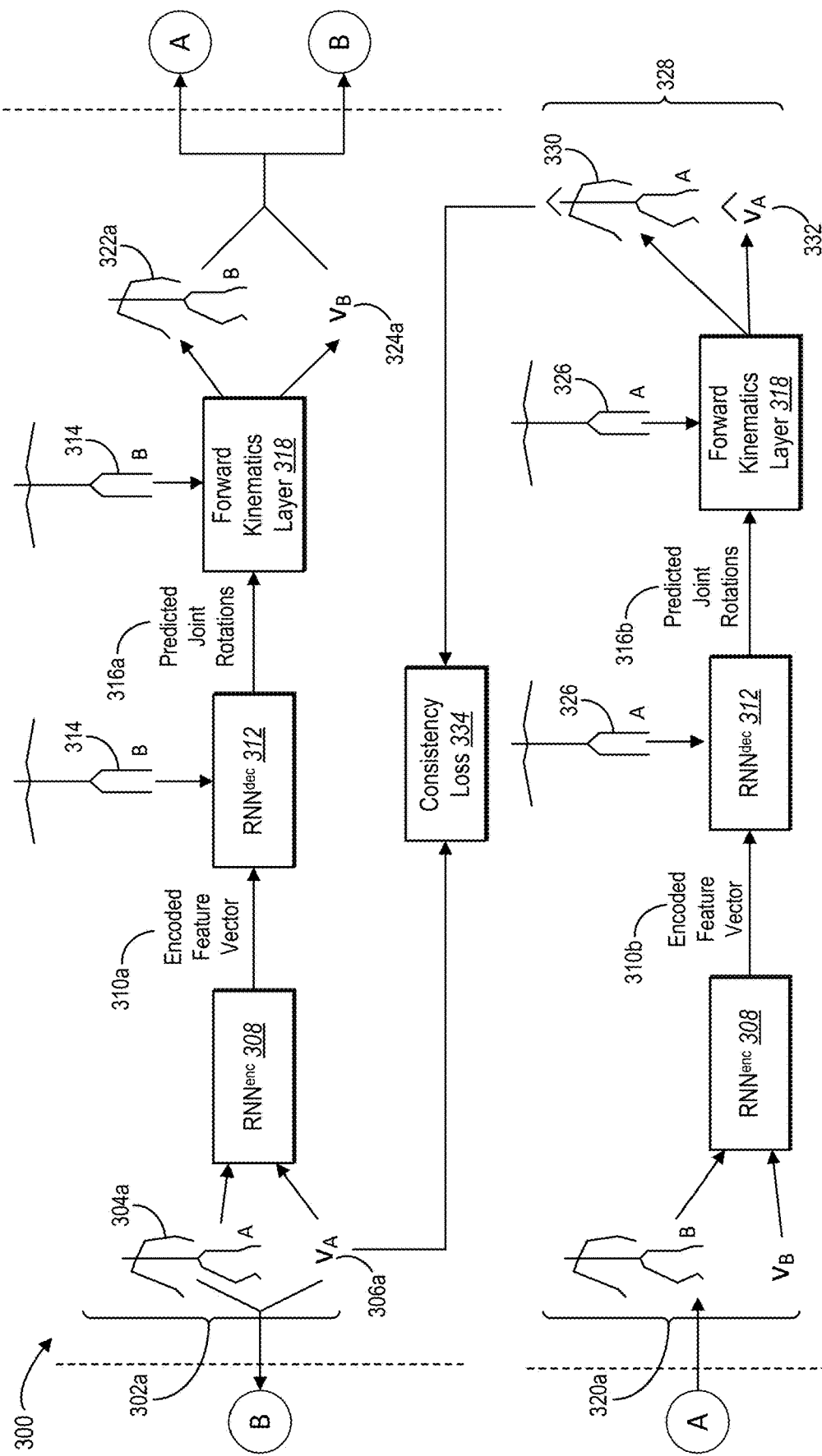
FIG. 3B illustrates a retargeted motion system determining a cycle consistency loss based on consistency joint features of a training initial skeleton and training input joint features of the training initial skeleton in accordance with one or more embodiments.
Figure 3C:
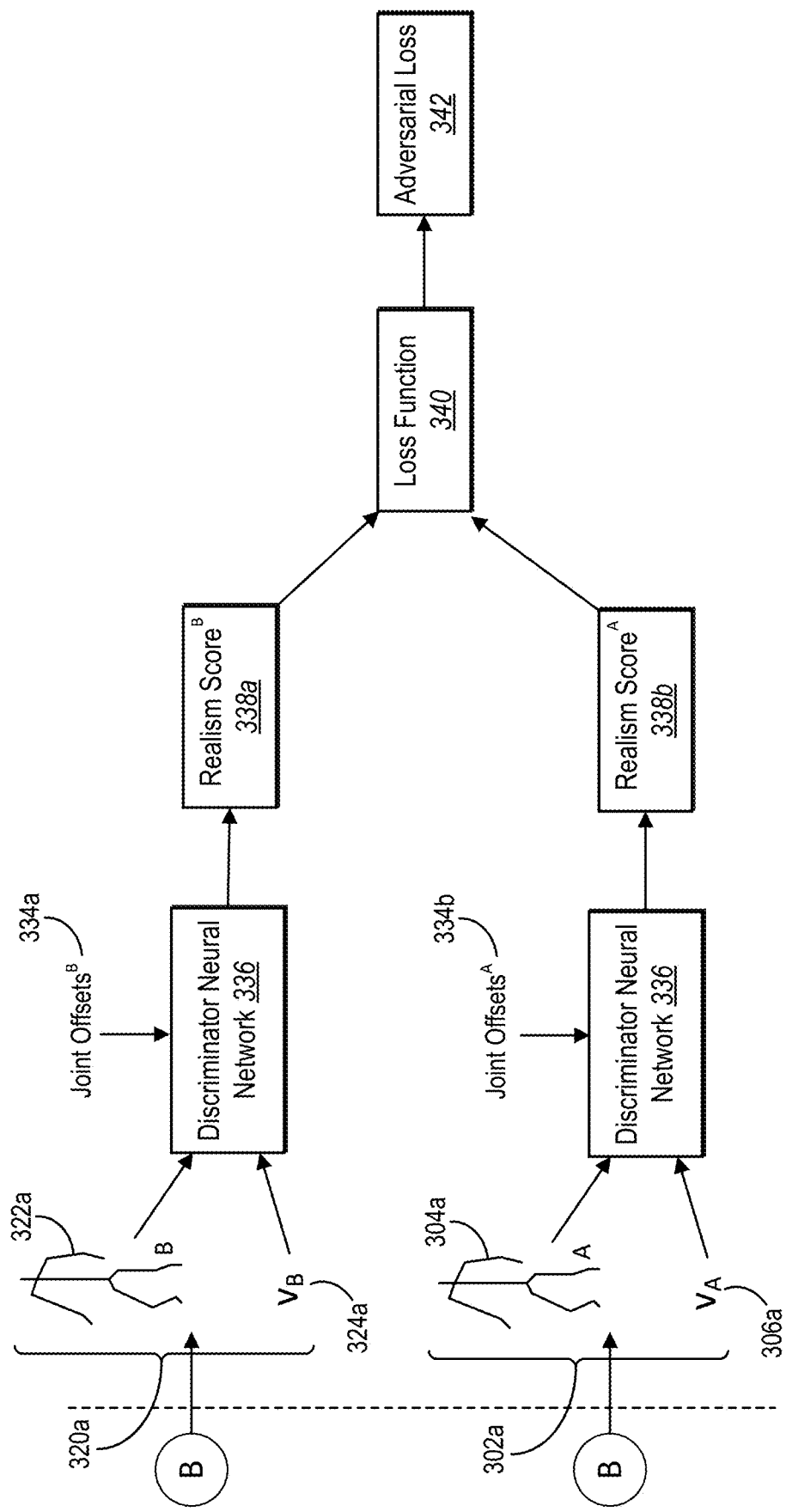
FIG. 3C illustrates a retargeted motion system determining an adversarial loss based on realism scores in accordance with one or more embodiments.

Relatedly, the term "motion synthesis neural network" includes a neural network that generates a target motion sequence for a target skeleton based on a motion sequence for an initial skeleton. In some embodiments, a motion synthesis neural network comprises a recurrent neural network ("RNN"). A recurrent neural network refers to a neural network where connections between units (nodes or layers) form a directed graph along a sequence. Such connections enable the RNN to model temporal behavior, movement, events, actions, or occurrences in a time sequence. In one or more embodiments, a motion synthesis neural network can include an encoder RNN, a decoder RNN, and a forward kinematics layer. As discussed in greater detail below, FIGS. 3A-3C depict an example of one such motion synthesis neural network.

As suggested by FIG. 1, the retargeted motion system inputs joint features of the initial skeleton corresponding to the times $110b$-$110h$ into the motion synthesis neural network. Based on these inputs, the motion synthesis neural network outputs predicted joint features of the target skeleton corresponding to the times $112b$-$110h$. Accordingly, the retargeted motion system uses initial joint features corresponding to times $110a$-$110h$ to generate predicted joint features corresponding to times $112a$-$112h$, respectively. Because the predicted joint features reflect the initial joint features, the target motion sequence 106 likewise reflects the motion sequence 102.

Figure 2:
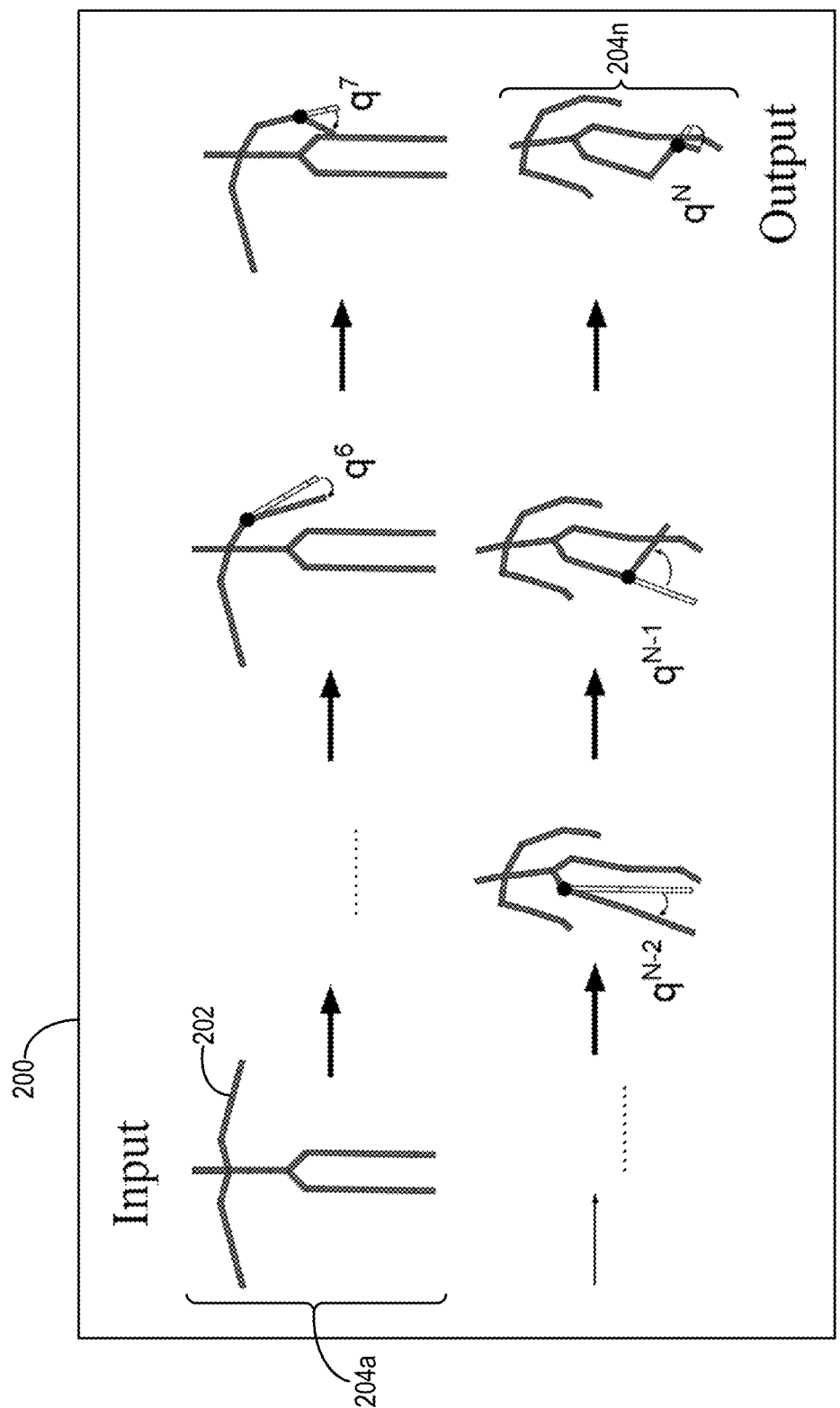
FIG. 2 illustrates a forward kinematics layer applying joint rotations to joints of a target skeleton to generate predicted joint features of the target skeleton for an initial time of a target motion sequence in accordance with one or more embodiments.

As noted above, the retargeted motion system uses a motion synthesis neural network that includes a forward kinematics layer. FIG. 2 depicts a forward kinematics layer 200 applying joint rotations to joints of a target skeleton to generate predicted joint features of the target skeleton in accordance with one or more embodiments. As shown in FIG. 2, the forward kinematics layer rotates joints of a target skeleton 202 from reference joint positions 204a to predicted joint positions 204n for an initial time of a target motion sequence. The predicted joint positions 204n represent part of the predicted joint features that the forward kinematics layer outputs.

As used in this disclosure, the term "forward kinematics layer" refers to a layer within a neural network that performs forward kinematics. For example, a forward kinematics layer may be a layer within a neural network that performs an algorithm or function for forward kinematics. In some embodiments, for example, the forward kinematics layer 200 receives rotation matrices and reference joint positions of a target skeleton as inputs. The forward kinematics layer 200 subsequently applies a rotation matrix to each joint (or to each of a subset of joints) of a target skeleton. Relatedly, as used in this disclosure, the term "reference joint positions" refers to the positions of a skeleton in a reference poses, such as a t-pose. For example, the term "reference joint positions" includes the positions of each joint from a skeleton in three dimensions (x, y, and z).

Forward kinematics generally refers to the process of determining joint positions for the joints of an input skeleton in three-dimensional space given certain joint rotations and initial joint positions. As shown in FIG. 2, the forward kinematics layer 200 performs forward kinematics by recursively rotating the joints of a target skeleton 202 from reference joint positions 204a to predicted joint positions 204n. In certain embodiments, the forward kinematics layer 200 initially rotates a root joint of the target skeleton 202, where the root joint is the highest joint within the hierarchy of the target skeleton 202 (e.g., a hip joint). The forward kinematics layer 200 then rotates the leaf joints of the target skeleton 202 (e.g., a knee joint), which include joints of a lower hierarchy in the skeleton's hierarchy than the root joint.

In certain embodiments, the forward kinematics layer 200 performs forward kinematics based on the following equation:

$$p^n = p^{parent(n)} + R^n \bar{s}^n \qquad (1)$$

In equation (1), $p^n$ represents the updated three-dimensional position of the n-th joint, where $p^n \in \mathbb{R}^3$. Conversely, $p^{parent(n)}$ represents the current position of the n-th joint, where $p^{parent(n)} \in \mathbb{R}^3$. For example, $p^n$ may be the position of an elbow joint in a humanoid skeleton, and $p^{parent(n)}$ may be the current position of a shoulder joint in the humanoid skeleton. As also shown in equation (1), $R^n$ represents the rotation of the n-th joint with respect to its parent joint, where $R^n \in \mathbb{SO}(3)$. As further indicated in equation (1), $\bar{s}^n$ represents the three-dimensional offset of the n-th joint relative to its parent joint in the input skeleton, where $\bar{s}^n \in \mathbb{R}^3$. Continuing the example above with shoulder and elbow joints, in some embodiments, $\bar{s}^n$ represents the difference between a position of an elbow joint and a position of a shoulder joint in three-dimensional space.

To further illustrate join offset, in some embodiments, the retargeted motion system uses the following equation to define offset of a joint:

$$\bar{s}^n = \bar{p}^n - \bar{p}^{parent(n)} \qquad (2)$$

In equation (2), $\bar{p}^n$ represents a reference position of the n-th joint in an input skeleton, such as a position of the n-th joint in the target skeleton 202 configured in a t-pose. As further indicated in equation (2), $\bar{p}^{parent(n)}$ represents a reference position of the n-th joint's parent joint in the input skeleton, such as the position of the n-th joint's parent joint in the target skeleton 202 configured in a t-pose. As shown in FIG. 2, the target skeleton 202 with reference joint positions 204a depict the target skeleton 202 in the t-pose.

The forward kinematics layer 200 shown in FIG. 2 adjusts the target skeleton 202 to generate predicted joint features corresponding to a particular time of a target motion sequence. In some such embodiments, for example, the retargeted motion system uses joint features $x_{1:T}$ comprising both $p_{1:T}$ and $v_{1:T}$. For each time t, in such embodiments, $p_t$ represents local joint positions of a joint in three dimensions (x, y, and z) with respect to a skeleton's root joint, where $p_t \in \mathbb{R}^{3N}$. In the humanoid skeleton shown in FIG. 2, the root joint may be a hip joint. Additionally, for each time t, $v_t$ represents global-motion parameters of the skeleton's root joint, where $v_t \in \mathbb{R}^4$. The global-motion parameters of the skeleton's root joint may comprise, for example, velocities of the root joint in three dimensions (x, y, and z) and rotation of the root joint with respect to an axis perpendicular to the ground. Given a target skeleton as an input, in some embodiments, the motion synthesis neural network provides the forward kinematics layer with rotations $R_t^n$ that the forward kinematics layer applies to each joint n at time t along with the global-motion parameters of a root joint.

As further suggested in FIG. 2, in some embodiments, the forward kinematics layer 200 receives three-dimensional rotations for each joint n of the target skeleton 202 at time t parameterized by unit quaternions $q_t^n$, where $q_t^n \in \mathbb{R}^4$. The forward kinematics layer 200 applies the three-dimensional rotations to the target skeleton 202 with joints in reference positions 204a. In some cases, the forward kinematics layer 200 receives the target skeleton 202 with joints in reference positions, where $\bar{s}$ represents the target skeleton with joints in reference positions for a t-pose.

A quaternion extends a complex number in the form $r + x\mathbb{i} + y\mathbb{j} + z\mathbb{k}$, where r, x, y, and z represent real numbers, and $\mathbb{i}$, $\mathbb{j}$, and $\mathbb{k}$ represent quaternion units. The forward kinematics layer 200 uses a quaternion to rotate objects in three-dimensional space. In one or more embodiments, the forward kinematics layer 200 uses a rotation matrix corresponding to an input quaternion for the rotations $R_t^n$, as follows:

$$R_t^n = \begin{pmatrix} 1-2(q_{tj}^{n2}+q_{tk}^{n2}) & 2(q_{ti}^n q_{tj}^n + q_{tk}^n q_{tr}^n) & 2(q_{ti}^n q_{tk}^n - q_{tj}^n q_{tr}^n) \\ 2(q_{ti}^n q_{tj}^n - q_{tk}^n q_{tr}^n) & 1-2(q_{ti}^{n2}+q_{tk}^{n2}) & 2(q_{tj}^n q_{tk}^n + q_{ti}^n q_{tr}^n) \\ 2(q_{ti}^n q_{tk}^n + q_{tj}^n q_{tr}^n) & 2(q_{tj}^n q_{tk}^n - q_{ti}^n q_{tr}^n) & 1-2(q_{ti}^{n2}+q_{tj}^{n2}) \end{pmatrix} \quad (3)$$

As indicated by equation (3), given the rotation matrices $R_t^n \in \mathbb{SO}(3)$ for each joint of a target skeleton, in some implementations, the forward kinematics layer 200 adjusts the joint positions of a target skeleton by applying these rotations in a recursive manner. FIG. 2 depicts an example of the forward kinematics layer 200 recursively applying unit quaternions for the rotations $R_t^n$ to each joint of the target skeleton 202, where the rotations $R_t^n$ correspond to a particular time of a target motion sequence.

As noted above, in certain embodiments, the forward kinematics layer 200 generates predicted joint features corresponding to a particular time of a motion sequence using the following equation:

$$p_t^{1:N} = FK(q_t^{1:N}, \bar{s}) \quad (4)$$

In equation (4), the forward kinematics layer 200 generates joint positions for each joint (i.e., joints 1 through N) of a target skeleton at a time t based on both the quaternions for each joint (i.e., joints 1 through N) and the target skeletons with reference joint positions. The forward kinematics layer 200 thus maps predicted joint rotations to predicted joint positions independent of differences between an initial skeleton and a target skeleton.

As noted above, in some embodiments, the retargeted motion system trains a motion synthesis neural network. FIGS. 3A-3C depict the retargeted motion system training a motion synthesis neural network 300. As an overview, FIG. 3A illustrates the retargeted motion system using the motion synthesis neural network 300 to generate predicted joint features of a training target skeleton B based on training input joint features of a training initial skeleton A. FIG. 3B illustrates the retargeted motion system using the motion synthesis neural network 300 to determine a cycle consistency loss. FIG. 3C illustrates the retargeted motion system using a discriminator neural network to determine an adversarial loss. The following paragraphs describe each of FIGS. 3A-3C in more detail.

As shown in FIG. 3A, the motion synthesis neural network 300 includes an encoder RNN 308, a decoder RNN 312, and a forward kinematics layer 318. In general, the retargeted motion system provides training input joint features 302a for a training initial skeleton A to the motion synthesis neural network 300. After several intermediary acts, the motion synthesis neural network 300 outputs predicted joint features 320a for a training target skeleton B. For purposes of illustration, FIG. 3A depicts a portion of the motion synthesis neural network 300 with only some of its architecture. This disclosure will describe additional portions of the motion synthesis neural network 300 in later figures.

As further indicated in FIG. 3A, the training input joint features 302a include joint positions 304a for joints of the training initial skeleton A and global-motion parameters 306a for a root joint of the training initial skeleton A. In relation to FIG. 3A, the global-motion parameters 306a comprise three-dimensional velocities and a rotation (with respect to an axis perpendicular to the ground) for the training initial skeleton A's root joint. Both the joint positions 304a and the global-motion parameters 306a correspond to an initial time of a training motion sequence. Although not shown in FIG. 3A, in certain embodiments, the training motion sequence may be similar to the motion sequence 102 from FIG. 1.

The retargeted motion system provides training input joint features 302a to the encoder RNN 308. Based on the training input joint features 302a, the encoder RNN 308 generates an encoded feature vector 310a. As used in this disclosure, the term "encoded feature vector" refers to a feature vector that an encoder RNN generates for mapping joint features. For example, in certain embodiments, the term "encoded feature vector" refers to an encoded representation of joint features for a particular time of a motion sequence. In the embodiment shown in FIG. 3A, the encoded feature vector 310a comprises encoded representations of the training input joint features 302a. As the retargeted motion system trains the motion synthesis neural network 300, the retargeted motion system modifies parameters of the encoder RNN 308 to generate more accurate encoded feature vectors.

As further shown in FIG. 3A, the encoder RNN 308 outputs the encoded feature vector 310a as an input for the decoder RNN 312. The decoder RNN 312 decodes the encoded feature vector 310a to generate a latent feature vector 315. As used in this disclosure, the term "latent feature vector" refers to a hidden representation of a joint feature. For example, the term "latent feature vector" refers to a hidden representation of joint features for a particular time of a motion sequence. In the embodiment shown in FIG. 3A, the latent feature vector 315 comprises hidden representations of the training input joint features 302a. As described below, the decoder RNN 312 uses the latent feature vector 315 in a subsequent training time cycle.

In addition to the encoded feature vector 310a, the retargeted motion system further inputs reference joint positions 314 of the training target skeleton B into the decoder RNN 312. As indicated in FIG. 3A, the reference joint positions 314 represent joint positions of the training target skeleton B in a t-pose. In alternative embodiments, the retargeted motion system uses joint positions from a different reference pose for the training target skeleton B. Regardless of the kind of reference positions, by analyzing the encoded feature vector 310a, the decoder RNN 312 generates predicted joint rotations 316a for joints of the training target skeleton B.

As used in this disclosure, the term "predicted joint rotations" refers to rotations of joints in a target skeleton (e.g., that would place the joints in a position that is part of a target motion sequence). In particular, in certain embodiments, the term "predicted joint rotations" refers to rotations of joints in a target skeleton that would place the joints of the target skeleton into a position as part of a target motion sequence. The position of the target motion sequence may correspond to a position of an initial motion sequence. As shown in FIG. 3A, in certain embodiments, the predicted joint rotations 316a represent rotation matrices pursuant to equation (3), where rotations among the rotation matrices would place the joints of the training target skeleton B into a position that is part of a training target motion sequence. In this case, the training motion sequence corresponds to the training initial skeleton A.

After the decoder RNN 312 generates the predicted joint rotations 316a, the forward kinematics layer 318 receives the predicted joint rotations 316a as inputs. The retargeted motion system further inputs the reference joint positions 314 of the training target skeleton B into the forward kinematics layer 318. Similar to the reference joint positions 314 described above, the reference joint positions 314 represent joint positions of the training target skeleton B in a t-pose, although other reference poses could be used.

Consistent with the disclosure above, the forward kinematics layer 318 applies the predicted joint rotations 316a to joints of the training target skeleton B with the reference joint positions 314. The forward kinematics layer 318 can perform the acts or equations of any of the embodiments of the forward kinematics layer 200 described above with reference to FIG. 2. For example, in certain implementations, the forward kinematics layer 318 applies a predicted rotation matrix to each joint of the training target skeleton B to generate predicted joint features 320a.

As shown in FIG. 3A, the predicted joint features 320a include predicted joint positions 322a for joints of the training target skeleton B and global-motion parameters 324a for a root joint of the training target skeleton B. Consistent with the disclosure above, in some embodiments, the global-motion parameters 324a are velocities in three dimensions for the training target skeleton B's root joint and a rotation of the root joint with respect to an axis perpendicular to the ground. Both the predicted joint positions 322a and the global-motion parameters 324a correspond to an initial time of a training target motion sequence.

In certain embodiments, the retargeted motion system conditions the motion synthesis neural network 300 based on feature vectors from previous training time cycles, including both encoded feature vectors and latent feature vectors. For example, in certain implementations, an encoder RNN generates an encoded feature vector according to the following equation:

$$h_t^{enc} = RNN^{enc}(x_t, h_{t-1}^{enc}, W^{enc}) \quad (5)$$

In equation (5), $RNN^{enc}$ represents an encoder RNN, and $h_t^{enc}$ represents an encoded feature vector up to time t. As further shown in equation (5), $x_t$ represents input joint features corresponding to time t, where $x_t$ includes both input joint positions $p_t$ for joints of an initial skeleton and input global-motion parameters $v_t$ for a root joint of the initial skeleton. As further indicated in equation (5), $h_{t-1}^{enc}$ represents an encoded feature vector up to time t−1, that is, the time before time t for the motion sequence. In addition, $W^{enc}$ represents a learnable parameter for the encoder RNN, where $W^{enc} \in \mathbb{R}^{d \times 4}$. Using the input joint features $x_t$ and the encoded feature vector $h_{t-1}^{enc}$ as inputs, the encoder RNN generates the encoded feature vector $h_t^{enc}$.

As shown in FIG. 3A, for example, the training input joint features 302a represent an example of the input joint features $x_t$, and the encoded feature vector 310a represents an example of the encoded feature vector $h_t^{enc}$. The encoder RNN 308 generates the encoded feature vector 310a based on the training input joint features 302a. In certain implementations, encoder RNN 308 generates the encoded feature vector 310a based in part on an encoded feature vector $h_{t-1}^{enc}$—to the extent the encoder RNN 308 previously generated an encoded feature vector. Although FIG. 3A does not depict examples of the encoded feature vector $h_{t-1}^{enc}$, this disclosure describes such vectors below with reference to FIG. 4.

In addition to conditioning an encoder RNN based on previous encoded feature vectors, in some embodiments, the retargeted motion system conditions a decoder RNN based on previous latent feature vectors. For example, in certain implementations, a decoder RNN generates a latent feature vector according to the following equations:

$$h_t^{dec} = RNN^{dec}(\hat{x}_{t-1}, h_t^{enc}, \bar{s}, h_{t-1}^{dec}, W^{dec}) \quad (6)$$

$$\hat{q}_t = \frac{W^{p^T} h_t^{dec}}{\|W^{p^T} h_t^{dec}\|} \quad (7)$$

$$\hat{p}_t = FK(\hat{q}_t, \bar{s}) \quad (8)$$

$$\hat{v}_t = W^{v^T} h_t^{dec} \quad (9)$$

$$\hat{x}_t = [\hat{p}_t, \hat{v}_t] \quad (10)$$

In equation (6), $h_t^{dec}$ represents a latent feature vector up to time t, and $h_{t-1}^{dec}$ represents an encoded feature vector up to time t−1, that is, the time before time t for a motion sequence. In equations (6) and (10), $\hat{x}_t$ represents predicted joint features corresponding to time t for a target skeleton $\bar{s}$. Relatedly, $\hat{x}_{t-1}$ represents predicted joint features corresponding to time t−1 for the target skeleton $\bar{s}$. As indicated in equations (8), (9), and (10), $\hat{p}_t$ represents the predicted joint positions corresponding to time t for a target skeleton $\bar{s}$, and $\hat{v}_t$ represents the predicted global-motion parameters corresponding to time t for the target skeleton $\bar{s}$. As indicated in equations (7) and (8), $\hat{q}_t$ represents predicted joint rotations that a forward kinematics layer applies to joints of the target skeleton $\bar{s}$, where $\hat{q}_t \in \mathbb{R}^{4N}$. The symbols $W^{dec}$, $W^p$, and $W^v$ represent learnable parameters of the decoder RNN, where $W^{dec}$ and $W^v \in \mathbb{R}^{d \times 4}$ and $W^p \in \mathbb{R}^{d \times 4N}$).

As shown in FIG. 3A, for example, the latent feature vector 315 represents an example of the encoded feature vector $h_t^{dec}$ and the predicted joint features 320a represent an example of the predicted joint features $\hat{x}_t$. The decoder RNN 312 generates the latent feature vector 315 based on the encoded feature vector $h_t^{enc}$. In certain implementations, decoder RNN 312 generates the latent feature vector 315 based in part on a latent feature vector $h_{t-1}^{dec}$—to the extent the decoder RNN 312 previously generated a latent feature vector. Although FIG. 3A does not depict examples of the latent feature vector $h_{t-1}^{dec}$, this disclosure describes such vectors below with reference to FIG. 4.

As indicated above, in certain embodiments, the retargeted motion system uses one or both of a cycle consistency loss and an adversarial loss to modify parameters of a motion synthesis neural network. By using a cycle consistency loss or an adversarial loss, the retargeted motion system creates an alternative to comparing predicted joint features to a ground truth paired training motion sequence during the training process (e.g., as an alternative to supervised training). This training approach in turn avoids the expense, unreliability, and tediousness of obtaining paired motion data that reflects joint features for two different skeletons performing the same motion sequence.

FIG. 3B illustrates a retargeted motion system determining a cycle consistency loss based on consistency joint features of a training initial skeleton and training input joint features of the training initial skeleton in accordance with one or more embodiments. In general, the retargeted motion system uses the motion synthesis neural network 300 to generate consistency joint features for a training initial skeleton for comparison with training input joint features for the same training initial skeleton.

In other words, the retargeted motion system can utilize a training initial skeleton to generate predicted joint features for a training target skeleton. The targeted motion system can then generate predicted joint features for the training initial skeleton (referred to as consistency joint features)

from the training target skeleton. A trained motion synthesis neural network 300 will produce consistency joint features that are consistent with (or the same) as the initial joint features. By determining a difference between the consistency joint features and the training input joint features for the same training initial skeleton, the retargeted motion system can train the motion synthesis neural network to more consistently and accurately generate predicted joint features.

The retargeted motion system uses the motion synthesis neural network 300 to generate consistency joint features using a process similar to that described above for generating predicted joint features. Indeed, as illustrated, the retargeted motion system utilizes the RNN encoder 308, the RNN decoder 312, and the forward kinematics layer 318 to generate predicted joint features 320a. The retargeted motion system then utilizes the motion synthesis neural network 300 to determine a consistency less 334.

Specifically, as shown in FIG. 3B, the retargeted motion system provides the predicted joint features 320a to the encoder RNN 308 as inputs. Consistent with the disclosure above, the encoder RNN 308 generates an encoded feature vector 310b based on the predicted joint features 320a. The decoder RNN 312 subsequently receives the encoded feature vector 310b as an input. The retargeted motion system also provides reference joint positions 326 of the training initial skeleton A to the decoder RNN 312. By analyzing the encoded feature vector 310b and the reference joint positions 326, the decoder RNN 312 generates predicted joint rotations 316b for joints of the training initial skeleton A.

After the decoder RNN 312 generates the predicted joint rotations 316b, the forward kinematics layer 318 receives the predicted joint rotations 316b as inputs. Consistent with the disclosure above, the forward kinematics layer 318 applies the predicted joint rotations 316b to joints of the training initial skeleton A with the reference joint positions 326. For example, in certain implementations, the forward kinematics layer 318 applies a predicted rotation matrix to each joint of the training initial skeleton A to generate consistency joint features 328 for the training initial skeleton A.

As shown in FIG. 3B, the consistency joint features 328 include predicted consistency joint positions 330 for joints of the training initial skeleton A and consistency global-motion parameters 332 for a root joint of the training initial skeleton A. Similar to the training input joint features 302a described above in FIG. 3A, both the predicted consistency joint positions 330 and the consistency global-motion parameters 332 in FIG. 3B correspond to an initial time of the training motion sequence for the training initial skeleton A.

After generating the consistency joint features 328, the retargeted motion system compares the training input joint features 302a to the consistency joint features 328. By comparing these joint features, the retargeted motion system can determine a cycle consistency loss 334 between the training input joint features 302a and the consistency joint features 328. As shown, the cycle consistency loss 334 represents a loss (or difference) between joint features of the same training initial skeleton A that each correspond to the same initial time of a training motion sequence. As described further below, in some embodiments, the retargeted motion system modifies parameters of the motion synthesis neural network 300 based on the cycle consistency loss. For example, in certain cases, the retargeted motion system modifies parameters of the motion synthesis neural network to decrease a cycle consistency loss in a subsequent training time cycle.

To further illustrate the process of determining a cycle consistency loss, in some embodiments, the retargeted motion system utilizes the following equations (or pseudo-code) to evaluate the accuracy of predicted joint features:

$$\hat{x}_{1:T}^B = f(x_{1:T}^A, \bar{s}^B) \tag{11}$$

$$\hat{x}_{1:T}^A = f(\hat{x}_{1:T}^B, \bar{s}^A) \tag{12}$$

In equation (11), $\hat{x}_{1:T}^B$ represents multiple predicted-joint-feature sets of the training target skeleton B, where each predicted-joint-feature set corresponds to a time 1 through T of a training target motion sequence. The symbol $\bar{s}^B$ represents the training target skeleton B. As further indicated by equation (13), $x_{1:T}^A$ represents multiple training-input-joint-feature sets of the training initial skeleton A, where each training-input-joint-feature set corresponds to a time 1 through T of a training motion sequence.

In equation (12), $\hat{x}_{1:T}^A$ represents multiple predicted-consistency-joint-feature sets of the training initial skeleton A, where each predicted-consistency-joint-feature set corresponds to a time 1 through T of the training motion sequence. The symbol $\hat{s}^A$ represents the training initial skeleton A. As further indicated by equation (12), $\hat{x}_{1:T}^B$ again represents multiple predicted-joint-feature sets of the training target skeleton B.

Together, equations (11) and (12) indicate that the retargeted motion system retargets a motion sequence from training initial skeleton A to the training target skeleton B—and then back to training initial skeleton A. This forward-and-backward retargeting represents a cycle that allows the retargeted motion system to determine whether a motion synthesis neural network consistently applies parameters to generate predicted joint features.

To determine a cycle consistency loss, in certain embodiments, the retargeted motion system applies the following equation:

$$C(\hat{x}_{1:T}^A, x_{1:T}^A) = \|x_{1:T} - \hat{x}_{1:T}^A\|_2^2 \tag{13}$$

In equation (13), the C represents a cycle consistency loss. As noted above, $\hat{x}_{1:t}^A$ represents multiple predicted-consistency-joint-feature sets of the training initial skeleton A, where each predicted-consistency-joint-feature set corresponds to a time 1 through T of the training motion sequence. Similarly, $x_{1:T}^A$ represents multiple training-input-joint-feature sets of the training initial skeleton A, where each training-input-joint-feature set corresponds to a time 1 through T of a training motion sequence. As indicated by equation (13), in certain embodiments, the retargeted motion system applies a square-loss function to determine a difference between a consistency-joint-feature set and a training-input-joint-feature set. In one or more embodiments, the retargeted motion system can utilize other loss functions, such as mean squared error, mean squared logarithmic error, mean absolute error, or other loss functions described herein.

As indicated above, the retargeted motion system may determine cycle consistency loss in a variety of ways. In some embodiments, the retargeted motion system determines a cycle consistency loss between one consistency-joint-feature set and one training-input-joint-feature set that each correspond to a particular time of a training input motion sequence. By contrast, in some embodiments, the retargeted motion system determines a cycle consistency loss between consistency-joint-feature sets that collectively correspond to a training input motion sequence and traininginput-joint-feature sets that collectively correspond to the same training input motion sequence. Accordingly, a cycle consistency loss can compare (i) consistency joint features and training input joint features corresponding to a particular time of a training input motion sequence or (ii) consistency-joint-feature sets and training-input-joint-feature sets corresponding to a training input motion sequence. As an example of the latter, in some embodiments, the consistency-joint-feature sets may include a consistency-joint-feature set for each time within a training input motion sequence, and the training-input-joint-feature sets may include a training-input-joint-feature set for each time within a training input motion sequence.

In addition (or in the alternative to) to determining a cycle consistency loss, in certain embodiments, the retargeted motion system determines an adversarial loss when training a motion synthesis neural network. To determine an adversarial loss, the retargeted motion system can use a discriminator neural network to generate realism scores for both predicted joint features and training input joint features. The retargeted motion system can use the adversarial loss to measure whether predicted joint features are realistic, that is, whether the predicted joint features resemble training input joint features from a training motion sequence. In such cases, the training motion sequence represents a real motion sequence that the regarded motion system uses for comparison.

FIG. 3C illustrates an embodiment of the retargeted motion system determining an adversarial loss in accordance with one or more embodiments. As shown in FIG. 3C, the retargeted motion system includes a discriminator neural network 336. In some embodiments, the discriminator neural network 336 comprises three consecutive layers, including a convolutional layer, a rectified-linear-units-and-pooling layer ("ReLU" layer), and a final layer that performs convolution with sigmoid activation. The retargeted motion system inputs the predicted joint features 320a and joint offsets 334a into the discriminator neural network 336, where both the predicted joint features 320a and the joint offsets 334a correspond to a time for the training target motion sequence. Taking the predicted joint features 320a and the joint offsets 334a as inputs, the discriminator neural network 336 generates a realism score 338a for the predicted joint features 320a.

As used in this disclosure, the term "realism score" refers to a score that indicates whether one or more joint features are part of (or come from) a real motion sequence (as opposed to predicted joint features for a target motion sequence). In some embodiments, the term "realism score" refers to a score indicating an extent or degree to which one or more joint features are part of (or come) from an input motion sequence (rather than predicted joint features). For example, the realism score 338a indicates a degree to which the predicted joint features 320a are part of an input motion sequence.

As further shown in FIG. 3C, the retargeted motion system also inputs the training input joint features 302a and joint offsets 334b into the discriminator neural network 336, where the joint offsets 334b correspond to a time for the training motion sequence. Taking the training input joint features 302a and the joint offsets 334b as inputs, the discriminator neural network 336 generates a realism score 338b for the training input joint features 302a. The realism score 338b indicates a degree to which the training input joint features 302a are part of an input motion sequence.

After determining the realism scores 338a and 338b, the retargeted motion system applies a loss function 340 to determine an adversarial loss 342. In certain embodiments, for example, the retargeted motion system determines the adversarial loss 342 from a loss measurement of both the realism score 338a and the realism score 338b. Although not shown in FIG. 3C, in certain embodiments, the retargeted motion system separately determines an adversarial loss for each of the realism score 338a and the realism score 338b using one or more loss functions. The retargeted motion system can utilize a variety of loss functions, including, for example, mean squared error, mean squared logarithmic error, mean absolute error, cross entropy loss, negative logarithmic likelihood loss, or L2 loss.

In addition to determining the adversarial loss 342, the retargeted motion system modifies parameters of both the motion synthesis neural network 300 and the discriminator neural network 336 based on the adversarial loss 342. For example, in certain embodiments, the retargeted motion system modifies parameters of the motion synthesis neural network 300 based on an objective to increase the adversarial loss 342 (or decrease the adversarial loss 342, depending on whether the loss is viewed as a positive or negative). In some such embodiments, the retargeted motion system also modifies parameters of the discriminator neural network 336 based on an objective to decrease the adversarial loss 342 (or increase the adversarial loss 342, depending on whether the loss is viewed as a positive or negative).

In some implementations, the retargeted motion system trains the motion synthesis neural network 300 to fool the discriminator neural network 366 in a generator-discriminator relationship. For example, in multiple training time cycles, the retargeted motion system modifies the parameters of the motion synthesis neural network 300 to fool the discriminator neural network 336 into determining that predicted joint features are real based on a realism score. By contrast, the retargeted motion system modifies the parameters of the discriminator neural network 336 to more accurately determine whether predicted joint features are real or fake based on a realism score.

To further illustrate adversarial loss, in some embodiments, the retargeted motion system inputs training-input-joint-feature sets $x_{1:T}^A = [p_{1:T}^A, v_{1:T}^A]$ and joint offsets for the training initial skeleton into a discriminator neural network g. Taking these inputs as real data, the retargeted motion system uses the following equation to determine a realism score for one or more of the training-input-joint feature sets:

$$r^A = g(p_{2:T}^A - p_{1:T-1}^A, v_{1:T-1}^A, s_{1:T-1}^A) \tag{14}$$

In equation (14), $r^A$ represents an output of the discriminator neural network g and a realism score for the training-input-joint-feature sets $x_{1:T}^A = [p_{1:T}^A v_{1:T}^A]$. The inputs $p_{2:T}^A - p_{1:T-1}^A$ represent multiple positions for joints of the training initial skeleton A corresponding to each time of the training motion sequence. Accordingly, the discriminator neural network g compares positions for joints at adjacent times from time 1 through time T. Additionally, $v_{1:T-1}^A$ represents global motion parameters (e.g., velocities and rotation of the training initial skeleton A's root joint) for each time of the training motion sequence through T-1. Moreover, $s_{1:T-1}^A$ represents the joint offsets computed from the joint positions of the training initial skeleton A at each time t of the training motion sequence through T-1. Accordingly, in certain embodiments, the discriminator neural network 336 determines the realism score 338a using equation (14).

Similarly, in some embodiments, the retargeted motion system inputs predicted-joint-feature sets $\hat{x}_{1:T}^B = [\hat{p}_{1:T}^B, \hat{v}_{1:T}^B]$ and joint offsets for the training target skeleton into the discriminator neural network g. Taking these inputs as fake data, the retargeted motion system uses the following equation to determine a realism score for one or more of the predicted-joint feature sets:

$$r^B = g(\hat{p}_{2:T}^B - \hat{p}_{1:T-1}^B, \hat{v}_{1:T-1}^B, \hat{s}_{1:T-1}^B) \quad (15)$$

In equation (15), $r^B$ represents an output of the discriminator neural network g and a realism score for the predicted-joint-feature sets $\hat{x}_{1:T}^B = [\hat{p}_{1:T}^B, \hat{v}_{1:T}^B]$. The inputs $\hat{p}_{2:T}^B - \hat{p}_{1:T-1}^B$ represent predicted positions for joints of the training target skeleton B corresponding to each time of the training target motion sequence. Accordingly, the discriminator neural network g compares positions for joints at adjacent times from time 1 through time T. Additionally, $\hat{v}_{1:T-1}^B$ represents global motion parameters (e.g., velocities and a rotation of the training target skeleton B's root joint) for each time of the training target motion sequence through T-1. Moreover, $\hat{s}_{1:T-1}^B$ represents the joint offsets computed from the joint positions of the training target skeleton B at each time t of the training target motion sequence through T-1. Accordingly, in certain embodiments, the discriminator neural network 336 determines the realism score 338b using equation (15).

In addition to using equations (14) and (15) to determining realism scores, in certain embodiments, the retargeted motion system randomly samples training initial skeletons from available skeletons, such as sampling from an internal or third-party database. In some instances, the retargeted motion system randomly selects training target skeleton B as the training initial skeleton. In such instances, the training initial skeleton can turn out to be the same as the training target skeleton, and thus $\hat{x}_{1:T}^B = \hat{x}_{1:T}^A$.

To account for the random selection of a training initial skeleton, in some embodiments, the retargeted motion system uses the following equation to switch between adversarial loss and square loss:

$$R(\hat{x}_{1:T}^B, x_{1:T}^A) = \begin{cases} \|\hat{x}_{1:T}^B - x_{1:T}^A\|_2^2, & \text{if } B = A \\ \log r^A + \beta \log(1 - r^B), & \text{otherwise} \end{cases} \quad (16)$$

In equation (16), β represents a balancing term that regulates the strength of a discriminator signal to modify the parameters of a motion synthesis neural network f to fool the discriminator neural network g. In some instances, for example, β=0.001. Equation (16) indicates a few options for determining R. If, on the one hand, the training target skeleton B is the same as the training initial skeleton A, the retargeted motion system determines a square loss. If, on the other hand, the training target skeleton B differs from the training initial skeleton A, the retargeted motion system determines an adversarial loss based on the realism scores for both predicted-joint feature sets and training-input-joint feature sets.

When the retargeted motion system determines an adversarial loss, the system relies on the motion distributions that the discriminator neural network g learns as a training signal. By observing other motion sequences performed by the training target skeleton B, the discriminator neural network learns to identify motion behaviors of the training target skeleton B. Additionally, the motion synthesis neural network uses the motion sequences performed by the training target skeleton B as indirect guidance to learn how to retarget a motion sequence to the training target skeleton B and thus fool the discriminator neural network.

As indicated above, the retargeted motion system may determine adversarial loss in a variety of ways. In some embodiments, the retargeted motion system determines an adversarial loss based on a first realism score for predicted joint features corresponding to a particular time of a training target motion sequence and a second realism score for training input joint features corresponding to a particular time of a training motion sequence. By contrast, in some embodiments, the retargeted motion system determines an adversarial loss based on a first realism score for predicted-joint-feature sets corresponding to a training target motion sequence and a second realism score for training-input-joint-feature sets corresponding to a training motion sequence. As an example of the latter, in some embodiments, the predicted-joint-feature sets for the first realism score include a predicted-joint-feature set for each time within a training target motion sequence, and the training-input-joint-feature sets for the second realism score include a training-input-joint-feature set for each time within a training motion sequence.

As suggested above, in some embodiments, the retargeted motion system uses both an adversarial loss and a cycle consistency loss to train a motion synthesis neural network. For example, in some implementations, the retargeted motion system modifies parameters of the motion synthesis neural network 300 based on an objective to increase an adversarial loss in subsequent training time cycles and an objective to decrease a cycle consistency loss in subsequent training time cycles. In some such implementations, the retargeted motion system further modifies parameters of the discriminator neural network based on an objective to decrease the adversarial loss.

To illustrate another embodiment that uses both adversarial loss and cycle consistency loss, in certain implementations, the retargeted motion system determines an adversarial loss based on inputs $\hat{x}_{1:T}^B$ and $x_{1:T}^A$, which respectively represent multiple predicted-joint-feature sets of the training target skeleton B and multiple training-input-joint-feature sets of the training initial skeleton A. The retargeted motion system further determines a cycle consistency loss based on $\hat{x}_{1:T}^A$ and $x_{1:T}^A$, where $\hat{x}_{1:T}^A$ represents multiple predicted-join-feature sets of the training initial skeleton A and. To utilize both the adversarial loss and the cycle consistency loss, the retargeted motion system uses the following training objective:

$$\min_f \max_g C(\hat{x}_{1:T}^A, x_{1:T}^A) + R(\hat{x}_{1:T}^B, x_{1:T}^A) \quad (17)$$

As indicated in equation (17), C represents the cycle consistency loss according to equation (13). Moreover, R represents the adversarial loss according to equation (16). Pursuant to the training objective in function (17), the retargeted motion system modifies the parameters of the motion synthesis neural network f to minimize loss. Moreover, the retargeted motion system modifies the parameters of the discriminator neural network g to maximize loss.

Depending on how loss is defined, the retargeted motion system can seek to maximize loss utilizing the discriminator neural network and minimize loss utilizing the motion synthesis neural network. Regardless of whether phrased as maximizing or minimizing, however, the retargeted motion system can utilize adversarial objectives and an adversarial loss (together with consistency loss) to train the motion synthesis neural network.

Figure 4:
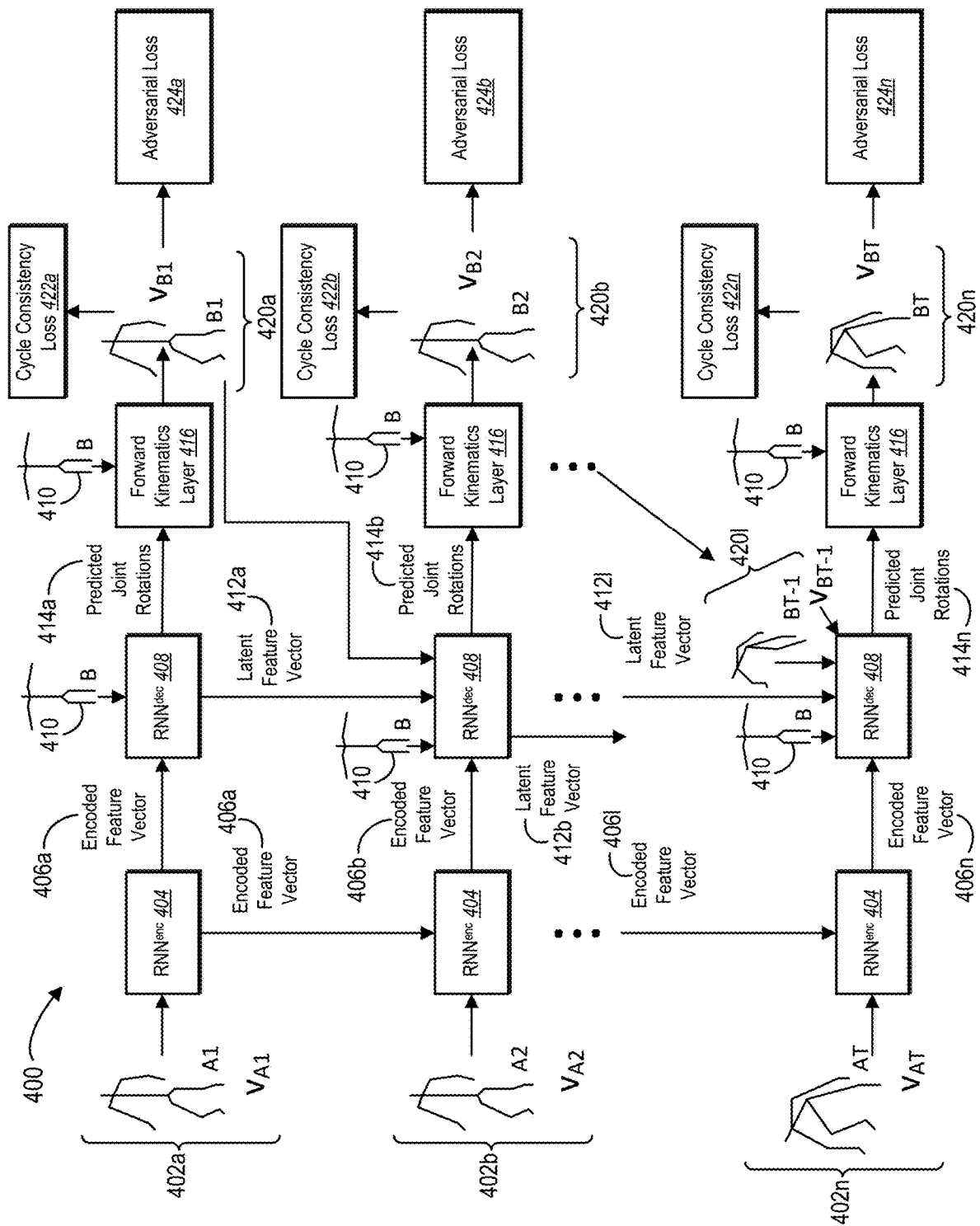
FIG. 4 illustrates a retargeted motion system training a motion synthesis neural network to generate target skeleton motion sequences from initial skeleton motion sequences in accordance with one or more embodiments.

As suggested above, in certain embodiments, the retargeted motion system trains a motion synthesis neural network for multiple times in a motion sequence. In particular, the retargeted motion system can train the motion synthesis neural network by performing multiple time cycles that correspond to the times (e.g., frames) in a motion sequence. FIG. 4 illustrates the retargeted motion system training a motion synthesis neural network 400 to generate target skeleton motion sequences from initial skeleton motion sequences. As an overview, the retargeted motion system performs multiple training time cycles of inputting training input joint features into the motion synthesis neural network 400, generating predicted joint features, and modifying neural network parameters based on a cycle consistency loss and an adversarial loss. By iteratively inputting and analyzing training input joint features, the retargeted motion system trains the motion synthesis neural network 400 to analyze a motion sequence frame by frame to perform online motion retargeting on the fly.

As shown in FIG. 4, the motion synthesis neural network 400 includes an encoder RNN 404, a decoder RNN 408, and a forward kinematics layer 416. In a first training time cycle, the retargeted motion system provides training input joint features 402a of a training initial skeleton A to the encoder RNN 404. As depicted, the training input joint features 402a correspond to a first time of a training motion sequence. After receiving the training input joint features 402a, the encoder RNN 404 generates an encoded feature vector 406a for the training input joint features 402a.

Taking the encoded feature vector 406a and reference joint positions 410 of the training target skeleton B as inputs, the decoder RNN 408 generates predicted joint rotations 414a for the training target skeleton B. Here, the predicted joint rotations 414a correspond to a first time of a training target motion sequence, such as a first time of the training target motion sequence equivalent to the first time of the training motion sequence. In addition to the predicted joint rotations 414a, the decoder RNN 408 generates a latent feature vector 412a, which the decoder RNN 408 uses in a second training time cycle described below.

As further shown in the first training time cycle, the forward kinematics layer 416 receives the predicted joint rotations 414a and the reference joint positions 410 of the training target skeleton B as inputs. The forward kinematics layer 416 subsequently applies the predicted joint rotations 414a to joints of the training target skeleton B to generate predicted joint features 420a. As depicted, the predicted joint features 420a correspond to the first time of the training target motion sequence.

After the motion synthesis neural network 400 generates the predicted joint features 420a, the retargeted motion system determines a cycle consistency loss 422a for the training input joint features 402a (e.g., using any of the methods, functions, or embodiments described above with reference to FIG. 3B). As further shown in the first training time cycle, the retargeted motion system determines an adversarial loss 424a for the predicted joint features 420a (e.g., using any of the methods, functions, or embodiments described above with reference to FIG. 3C.

Based on the cycle consistency loss 422a and the adversarial loss 424a, the retargeted motion system modifies parameters of the motion synthesis neural network 400 and a discriminator neural network (not shown). In some embodiments, the retargeted motion system modifies parameters of the motion synthesis neural network 400 based on an objective to increase an adversarial loss and an objective to decrease a cycle consistency loss. The retargeted motion system further modifies parameters of the discriminator neural network based on an objective to decrease an adversarial loss.

As further shown in FIG. 4, the retargeted motion system runs a second training time cycle through the motion synthesis neural network 400. Accordingly, the retargeted motion system provides the encoded feature vector 406a and training input joint features 402b of the training initial skeleton A to the encoder RNN 404. As depicted, the training input joint features 402b correspond to a second time of the training motion sequence. After receiving the training input joint features 402b, the encoder RNN 404 generates an encoded feature vector 406b for the training input joint features 402b.

As further shown in the second training time cycle, the decoder RNN 408 receives multiple inputs, including the encoded feature vector 406b, the reference joint positions 410 of the training target skeleton B, the latent feature vector 412a (from the first time of the training motion sequence and the first training time cycle), and the predicted joint features 420a (from the first time of the training target motion sequence and the first training time cycle). The decoder RNN 408 uses the predicted joint features 420a as a reference point for determining predicted joint rotations corresponding to a second time of the training target motion sequence. Based on the foregoing inputs, the decoder RNN 408 generates predicted joint rotations 414b for the training target skeleton B. Here, the predicted joint rotations 414b correspond to a second time of the training target motion sequence. In addition to the predicted joint rotations 414b, the decoder RNN 408 generates a latent feature vector 412b, which the decoder RNN 408 uses in a subsequent training time cycle.

Continuing the second training time cycle, the forward kinematics layer 416 receives the predicted joint rotations 414b and the reference joint positions 410 of the training target skeleton B as inputs. The forward kinematics layer 416 then applies the predicted joint rotations 414b to joints of the training target skeleton B to generate predicted joint features 420b. In the second training time cycle, the predicted joint features 420b correspond to the second time of the training target motion sequence. Consistent with the disclosure above, the retargeted motion system further determines a cycle consistency loss 422b based on the training input joint features 402b and an adversarial loss 424b based on the predicted joint features 420b. The retargeted motion system modifies the parameters of the motion synthesis neural network 400 and the discriminator neural network based on the cycle consistency loss 422b and the adversarial loss 424b—according to the objectives described above with respect to the first training time cycle.

As indicated by FIG. 4, the retargeted motion system runs additional training time cycles through the motion synthesis neural network 400. The additional training time cycles resemble the second training time cycle in terms of the inputs and outputs of the motion synthesis neural network 400 and determinations of cycle consistency loss and adversarial loss. After indicating some of the additional training time cycles with ellipses, FIG. 4 illustrates a terminal training time cycle that corresponds to a final training-input-joint-feature set of a training motion sequence. While FIG. 4 depicts time cycles for one training motion sequence, in certain embodiments, the retargeted motion system further trains the motion synthesis neural network 400 using additional training input joint features for additional training motion sequences.

In the terminal training time cycle, the retargeted motion system provides an encoded feature vector 406*l* (from a previous training time cycle) and training input joint features 402*n* of the training initial skeleton A to the encoder RNN 404. Here, the training input joint features 402*n* correspond to a final time of the training motion sequence. The encoder RNN 404 then generates an encoded feature vector 406*n* for the training input joint features 402*n*.

As shown in the terminal training time cycle, the decoder RNN 408 receives the following inputs: the encoded feature vector 406*n*, the reference joint positions 410 of the training target skeleton B, a latent feature vector 412*l* (from a previous training time cycle) and predicted joint features 420*l* (from a previous training time cycle). Based on these inputs, the decoder RNN 408 generates predicted joint rotations 414*n* for the training target skeleton B, where the predicted joint rotations 414*n* correspond to a final time of the training target motion sequence.

Continuing the terminal training time cycle, the forward kinematics layer 416 receives the predicted joint rotations 414*n* and the reference joint positions 410 of the training target skeleton B as inputs. The forward kinematics layer 416 applies the predicted joint rotations 414*n* to joints of the training target skeleton B to generate predicted joint features 420*n*, which correspond to the final time of the training target motion sequence.

Consistent with the disclosure above, the retargeted motion system further determines a cycle consistency loss 422*n* based on the training input joint features 402*n* and an adversarial loss 424*n* based on the predicted joint features 420*n*. The retargeted motion system then modifies the parameters of the motion synthesis neural network 400 and the discriminator neural network based on the cycle consistency loss 422*n* and the adversarial loss 424*n*—according to the objectives described above with respect to the first training time cycle.

In the embodiment shown in FIG. 4, the retargeted motion system cyclically generates predicted joint features corresponding to a particular time of a training target motion sequence and determines a cycle consistency loss and an adversarial loss after each training time cycle. Together, the predicted joint features 420*a*-420*n* form the training target motion sequence for the training target skeleton B.

Alternatively, in some embodiments, the retargeted motion system determines a cycle consistency loss and an adversarial loss after generating every predicted-joint-feature set corresponding to times of a training target motion sequence. For example, in some cases, the motion synthesis neural network 400 generates each of the predicted joint features 420*a*-420*n* respectively corresponding to the first through final times of a training target motion sequence—before determining a cycle consistency loss and an adversarial loss and modifying neural network parameters.

Regardless of when the retargeted motion system determines a loss function, the system can utilize different combinations of the loss function described above. For example, in certain implementations, the retargeted motion system determines a cycle consistency loss without an adversarial loss (or an adversarial loss without a cycle consistency loss) after each training time cycle. Alternatively, the retargeted motion system determines a cycle consistency loss without an adversarial loss (or an adversarial loss without a cycle consistency loss) after generating each of the predicted joint features corresponding to a training target motion sequence.

By contrast, in some implementations, the retargeted motion system does not use a cycle consistency loss or an adversarial loss to train a motion synthesis neural network. For example, in certain embodiments, the retargeted motion system trains the motion synthesis neural network using both (i) training-input-joint-feature sets corresponding to a training motion sequence for the training initial skeleton A and (ii) ground-truth-joint-feature sets corresponding to the training target skeleton B. The ground-truth-joint-feature sets represent a ground truth with which the retargeted motion system can compare predicted-joint-feature sets corresponding to the training target skeleton B.

Based on a comparison of the ground-truth-joint-feature sets and the predicted-joint-feature sets, the retargeted motion system can determine a loss from a loss function (e.g., square loss function). In such embodiments, the retargeted motion system may determine the loss either after each training time cycle or after finishing training time cycles corresponding to the training-input-joint-feature sets. By running multiple iterations, the retargeted motion system can modify parameters of the motion synthesis neural network to decrease a loss between ground-truth-joint-feature sets and predicted-joint-feature sets.

In addition (or in the alternative) to training the motion synthesis neural network, in some embodiments, the retargeted motion system uses a motion synthesis neural network to generate a target motion sequence from an initial motion sequence. When using a motion synthesis neural network that has been trained, in some embodiments, the retargeted motion system uses joint features of an initial skeleton for a motion sequence as an analogue to training joint features of a training initial skeleton for a training motion sequence. Similarly, the retargeted motion system uses predicted joint rotations and predicted joint features of a target skeleton for a target motion sequence as an analogue to predicted joint rotations and predicted joint features of a training target skeleton for a training target motion sequence. Moreover, during application, an encoder RNN, a decoder RNN, and a forward kinematics layer perform the same type of functions as they do during training.

Accordingly, the description and embodiments set forth above for the motion synthesis neural network, training joint features, training initial skeleton, training motion sequence, predicted joint rotations, predicted joint features, training target skeleton, and training target motion sequence for training respectively apply to the motion synthesis neural network, joint features, initial skeleton, motion sequence, predicted joint rotations, predicted joint features, target skeleton, and target motion sequence for application. During application, however, the retargeted motion system does not typically determine cycle consistency loss or adversarial loss or modify neural network parameters.

Figure 5:
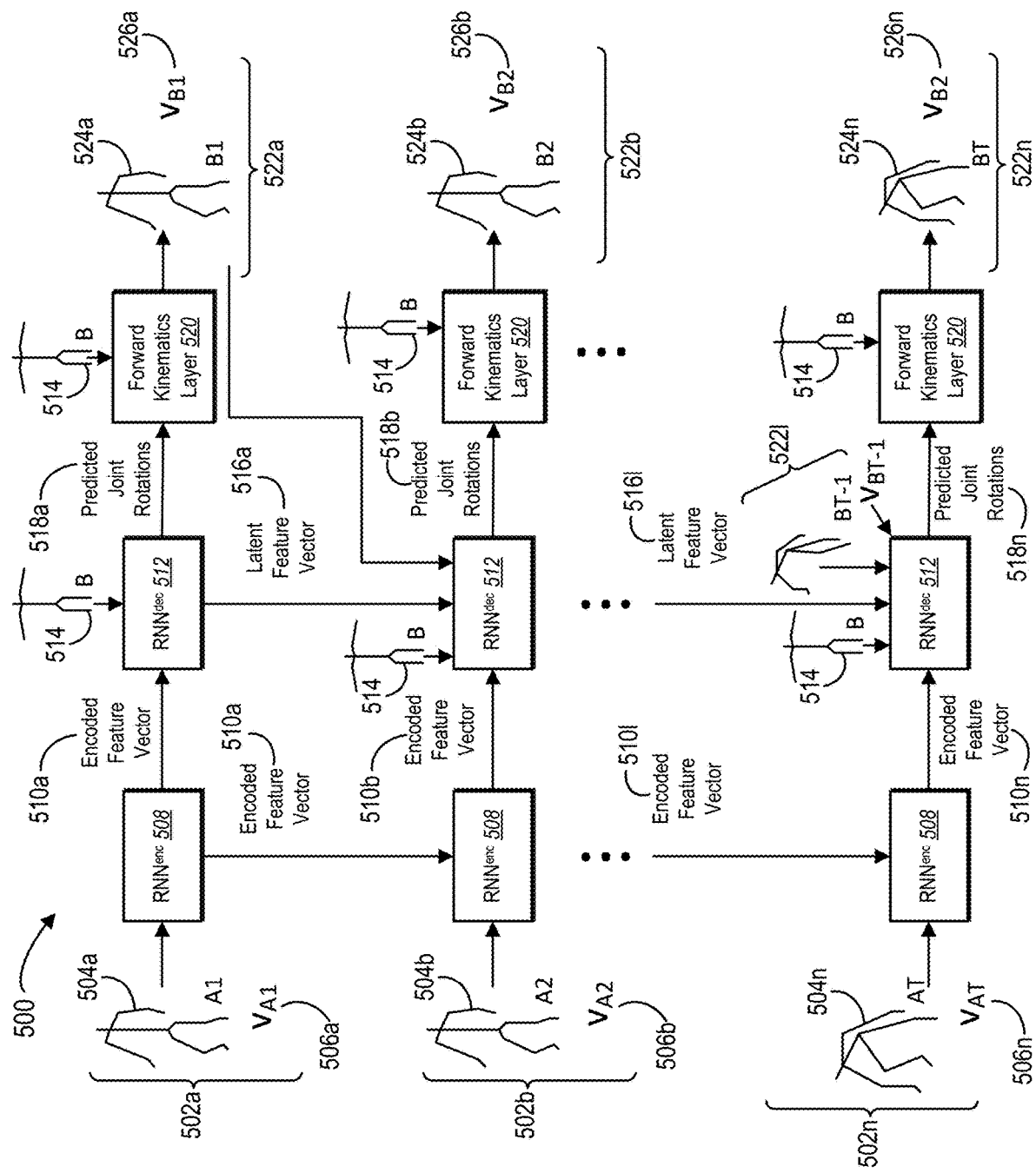
FIG. 5 illustrates a retargeted motion system using a motion synthesis neural network to generate a target skeleton motion sequence from an initial skeleton motion sequence in accordance with one or more embodiments.

FIG. 5 illustrates a retargeted motion system using a motion synthesis neural network 500 to generate a target skeleton motion sequence from an initial skeleton motion sequence in accordance with one or more embodiments. As an overview, the retargeted motion system performs multiple time cycles of inputting initial joint features into the motion synthesis neural network 500 and generating predicted joint features for a target motion sequence. By iteratively inputting and analyzing joint features, the retargeted motion system can use the motion synthesis neural network 500 to analyze a motion sequence frame by frame and perform online motion retargeting on the fly.

As shown in FIG. 5, the motion synthesis neural network 500 includes an encoder RNN 508, a decoder RNN 512, and a forward kinematics layer 520. In a first time cycle, the retargeted motion system provides joint features 502*a* of an initial skeleton A to the encoder RNN 508. As depicted, the joint features 502a correspond to a first time of a motion sequence. Moreover, the joint features 502a include joint positions 504a for joints of the initial skeleton A and global-motion parameters 506a for a root joint of the initial skeleton A. After receiving the joint features 502a, the encoder RNN 508 generates an encoded feature vector 510a for the joint features 502a.

Taking the encoded feature vector 510a and reference joint positions 514 of the target skeleton B as inputs, the decoder RNN 512 generates predicted joint rotations 518a for the target skeleton B. Here, the predicted joint rotations 518a correspond to a first time of a target motion sequence. In addition to the predicted joint rotations 518a, the decoder RNN 512 generates a latent feature vector 516a, which the decoder RNN 512 uses in a second time cycle described below.

As further shown in the first time cycle, the forward kinematics layer 520 receives the predicted joint rotations 518a and the reference joint positions 514 of the target skeleton B as inputs. The forward kinematics layer 520 subsequently applies the predicted joint rotations 518a to joints of the target skeleton B to generate predicted joint features 522a. As depicted, the predicted joint features 522a correspond to the first time of the target motion sequence. Moreover, the predicted joint features 522a include predicted joint positions 524a for joints of the target skeleton B and global-motion parameters 526a for a root joint of the target skeleton B.

As further shown in FIG. 5, the retargeted motion system runs a second time cycle through the motion synthesis neural network 500. Accordingly, the retargeted motion system provides the encoded feature vector 510a and joint features 502b of the initial skeleton A to the encoder RNN 508. As depicted, the joint features 502b correspond to a second time of the motion sequence. Moreover, the joint features 502b include joint positions 504b for joints of the initial skeleton A and global-motion parameters 506b for a root joint of the initial skeleton A. After receiving the joint features 502b, the encoder RNN 508 generates an encoded feature vector 510b for the joint features 502b.

As further shown in the second time cycle, the decoder RNN 512 receives multiple inputs, including the encoded feature vector 510b, the reference joint positions 514 of the target skeleton B, the latent feature vector 516a, and the predicted joint features 522a. Based on the inputs, the decoder RNN 512 generates predicted joint rotations 518b for the target skeleton B. Here, the predicted joint rotations 518b correspond to a second time of the target motion sequence. In addition to the predicted joint rotations 518b, the decoder RNN 512 generates a latent feature vector 516b, which the decoder RNN 512 uses in a subsequent time cycle.

Continuing the second time cycle, the forward kinematics layer 520 receives the predicted joint rotations 518b and the reference joint positions 514 of the target skeleton B as inputs. The forward kinematics layer 520 then applies the predicted joint rotations 518b to joints of the target skeleton B to generate predicted joint features 522b. In the second time cycle, the predicted joint features 522b correspond to the second time of the target motion sequence. Moreover, the predicted joint features 522b include predicted joint positions 524b for joints of the target skeleton B and global-motion parameters 526b for a root joint of the target skeleton B.

As indicated by FIG. 5, the retargeted motion system runs additional time cycles through the motion synthesis neural network 500. The additional time cycles resemble the second time cycle in terms of the types of inputs and outputs of the motion synthesis neural network 500. After indicating some of the additional time cycles with ellipses, FIG. 5 illustrates a terminal time cycle that corresponds to a final joint-feature set of a motion sequence.

In the terminal time cycle, the retargeted motion system provides an encoded feature vector 510l (from a previous time cycle) and joint features 502n of the initial skeleton A to the encoder RNN 508. Here, the joint features 502n correspond to a final time of the motion sequence. Moreover, the joint features 502n include joint positions 504n for joints of the initial skeleton A and global-motion parameters 506n for a root joint of the initial skeleton A.

After receiving the encoded feature vector 510l and the joint features 502n as inputs, the encoder RNN 508 generates an encoded feature vector 510n for the joint features 502n. As shown in the terminal time cycle, the decoder RNN 512 receives the following inputs: the encoded feature vector 510n, the reference joint positions 514 of the target skeleton B, a latent feature vector 516l (from a previous time cycle), and predicted joint features 522l (from a previous time cycle). Based on these inputs, the decoder RNN 512 generates predicted joint rotations 518n for the target skeleton B, where the predicted joint rotations 518n correspond to a final time of the target motion sequence.

Continuing the terminal time cycle, the forward kinematics layer 520 receives the predicted joint rotations 518n and the reference joint positions 514 of the target skeleton B as inputs. The forward kinematics layer 520 subsequently applies the predicted joint rotations 518n to joints of the target skeleton B to generate predicted joint features 522n, which correspond to the final time of the target motion sequence. Here, the predicted joint features 522n include predicted joint positions 524n for joints of the target skeleton B and global-motion parameters 526n for a root joint of the target skeleton B.

By running multiple time cycles, the motion synthesis neural network 500 generates each of the predicted joint features 522a-522n respectively corresponding to the first through final times of a target motion sequence. Together, the predicted joint features 522a-522n form the target motion sequence for the target skeleton B. While FIG. 5 depicts time cycles for one motion sequence, in certain embodiments, the retargeted motion system further applies the motion synthesis neural network 500 to generate additional target motion sequences for additional target skeletons based on additional joint features for additional motion sequences.

In addition to generating predicted joint features, in some embodiments, the retargeted motion system renders animated objects performing target motion sequences of target skeletons corresponding to motion sequences of initial skeletons. For example, in some embodiments, the retargeted motion system renders an animated object performing a target motion sequence comprising predicted joint features. The animated objects may include, but are not limited to, animated animals, furniture, humanoids, instruments, plants, machines, toys, or vehicles. To render an animated object, in certain implementations, the retargeted motion system uses commercially available or open-source animation software, such as a three-dimensional modelling and rendering software from Blender Institute, Amsterdam, Netherlands.

Figure 6:
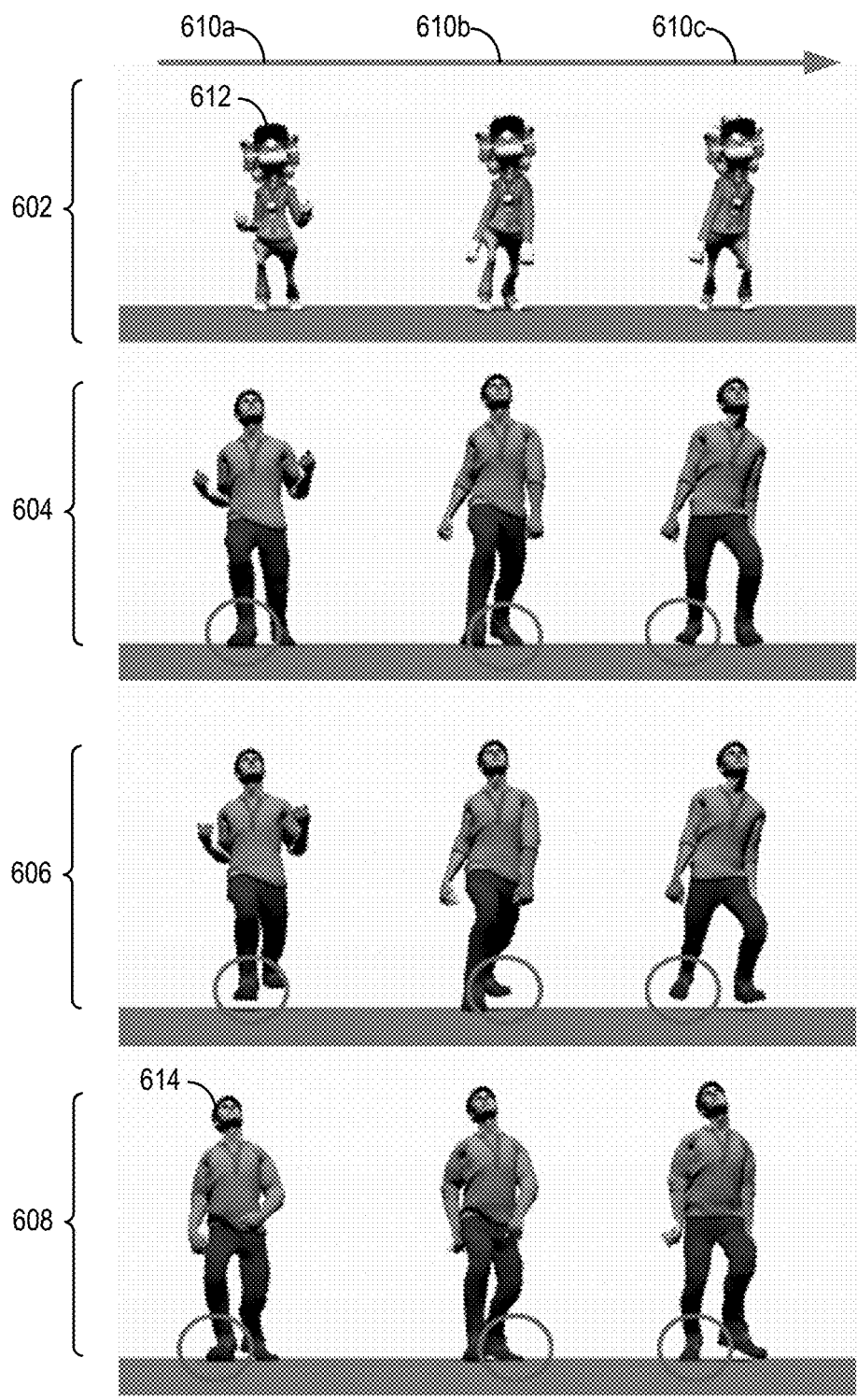
FIG. 6 illustrates a retargeted motion system rendering an animated character performing a target motion sequence of a target skeleton corresponding to a motion sequence of an initial skeleton in accordance with one or more embodiments.

FIG. 6 illustrates the retargeted motion system rendering an animated character 614 performing a target motion sequence 608 of a target skeleton corresponding to a motion sequence 602 of an initial skeleton. As suggested above, the retargeted motion system can generate predicted joint features corresponding to the target motion sequence 608 using the method described above with reference to FIG. 5. For purposes of comparing the target motion sequence 608 to other methods, FIG. 6 also illustrates a ground-truth-target-motion sequence 604 performed by the animated character 614 and a copy-quaternion-target-motion sequence 606 performed by the animated character 614.

As shown in FIG. 6, the retargeted motion system renders an animated character 612 performing the motion sequence 602 of an initial skeleton. FIG. 6 illustrates the motion sequence 602 for comparison with the target motion sequence 608. In the motion sequence 602, the animated character 612 includes a skin or mesh corresponding to the initial skeleton. As depicted, the motion sequence 602 comprises joint features of the initial skeleton that correspond to times 610a, 610b, and 610c. For explanatory purposes, this disclosure uses times 610a, 610b, and 610c as reference times to compare the motion sequence 602, the ground-truth-target-motion sequence 604, the copy-quaternion-target-motion sequence 606, and the target motion sequence 608.

As FIG. 6 suggests, the initial skeleton for the animated character 612 includes segments between joints that differ in length and proportion from corresponding segments in between joints of the target skeleton for the animated character 614. For example, the person portrayed in the animated character 612 has shorter legs, arms, and torso than the person portrayed in the animated character 614. Despite the differences between the initial skeleton and the target skeleton, the retargeted motion system uses the joint features of the initial skeleton as inputs to retarget the motion sequence 602 to a target skeleton corresponding to the animated character 614.

Consistent with the disclosure above, the retargeted motion system inputs the joint features for the motion sequence 602 into a motion synthesis neural network to generate predicted joint features for the target motion sequence 608. As shown in FIG. 6, the retargeted motion system renders the animated character 614 performing the target motion sequence 608 of the target skeleton. As depicted, the target motion sequence 608 comprises predicted joint features of the target skeleton that correspond to times 610a, 610b, and 610c.

In the embodiment shown in FIG. 6, the retargeted motion system did not use a motion synthesis neural network to generate predicted joint features of the target skeleton for some of the joints of the target skeleton, such as for finger joints. Accordingly, the predicted joint features for the body and legs of the animated character 614 in the target motion sequence 608 primarily demonstrate example results of the retargeted motion system.

As further shown in FIG. 6, for purposes of comparison, the retargeted motion system renders the animated character 614 performing the ground-truth-target-motion sequence 604. The ground-truth-target-motion sequence 604 includes joint features configured by computer animators to retarget the motion sequence 602 from the initial skeleton of the animated character 612 to the target skeleton of the animated character 614. In other words, the ground-truth-target-motion sequence 604 represents an accurate retargeting of the motion sequence 602 from the initial skeleton to the target skeleton.

The retargeted motion system further renders the animated character 614 performing the copy-quaternion-target-motion sequence 606. The copy-quaternion-target-motion sequence 606 includes joint features generated by an alternative method of retargeting a motion sequence, a Copy-Quaternion Technique. The Copy-Quaternion Technique directly copies input quaternions (per-joint rotations) and velocities from the motion sequence 602 and generates a target motion sequence for the target skeleton. Because this alternative motion retargeting method directly copies input quaternions and velocities, the alternative method does not adjust the joint features of the motion sequence 602 to the segments of different lengths and proportions of the target skeleton.

FIG. 6 indicates qualitative comparisons of different motion retargeting methods. The target motion sequence 608 includes certain predicted joint features that more accurately reflect the ground-truth-target-motion sequence 604 than the joint features of the copy-quaternion-target-motion sequence 606. For example, the joint features of the copy-quaternion-target-motion sequence 606 have resulted in a floating foot in the animated character 614 at times 610a and 610c. By contrast, the predicted joint features of the target motion sequence 608 result in foot positions on the ground and more accurately reflect the foot positions corresponding to the ground-truth-target-motion sequence 604.

In addition to this qualitative comparison, experimenters have evaluated different motion retargeting techniques with the retargeted motion system. For the retargeted motion system, the experimenters trained a motion synthesis neural network using the training method shown in FIG. 4 both with (i) adversarial loss and cycle consistency loss and with (ii) cycle consistency loss only. The experimenters also trained neural networks using several baselines of motion retargeting techniques. The first baseline ("Conditional Network") is a neural network architecture without a forward kinematics layer that directly outputs three-dimensional coordinates (in x, y, and z directions) for joint positions. The second baseline ("Conditional MLP") is a multilayer perceptron architecture that directly outputs three-dimensional coordinates (in x, y, and z directions) for joint positions. Both the Conditional Network and Conditional MLP fail to preserve segment lengths of the target skeleton in the output. The third baseline ("Conditional MLP+Optimization") uses the MLP architecture and iteratively optimizes encoded features to ensure that outputs match segment lengths of the target skeleton. The fourth baseline ("Copy-Quaternion Technique") uses the technique described above by directly copying input quaternions (per-joint rotations) from a motion sequence to generate a target motion sequence for the target skeleton.

To make quantitative comparisons, the experimenters trained a neural network using the retargeted motion system, Conditional Network, Conditional MLP, Conditional MLP+ Optimization, and Copy-Quaternion Technique by randomly sampling two-second motion clips (including 60 frames) from a group of training motion sequences. The experimenters further tested each motion retargeting method on non-overlapping motion clips of four seconds (including 120 frames). For training and testing, the experimenters used the following joints: Root, Spine, Spine1, Spine2, Neck, Head, LeftUpLeg, LeftLeg, LeftFoot, LeftToeBase, RightUpLeg, RightLeg, RightFoot, RightToeBase, LeftShoulder, LeftArm, LeftForeArm, LeftHand, RightShoulder, RightArm, RightForeArm, and RightHand.

The experimenters then compared the overall quality of the motion retargeting for each motion retargeting method using Mean Square Error ("MSE") on the estimated joint positions through time—normalized by the height of the target skeleton. Based on an MSE analysis of retargeted motions for the four-second clips, the retargeted motion system retargeted motion sequences with a lower MSE than other methods. For example, the retargeted motion system retargeted motion sequences with an MSE of 9.72 with cycle consistency loss only and with an MSE of 6.98 with both adversarial loss and cycle consistency loss. By contrast, the Copy-Quaternion Technique retargeted motion sequences with an MSE of 9.00. Table 1 below illustrates the MSE for each of the motion retargeting methods.

TABLE 1

| Method | MSE |
|---|---|
| Retargeted Motion System: Cycle Consistency Loss | 9.72 |
| Retargeted Motion System: Adversarial Loss and Cycle Consistency Loss | 6.98 |
| Conditional Network | 14.71 |
| Conditional MLP | 14.58 |
| Conditional MLP + Optimization | 24.01 |
| Copy-Quaternions Technique | 9.00 |

Figure 7:
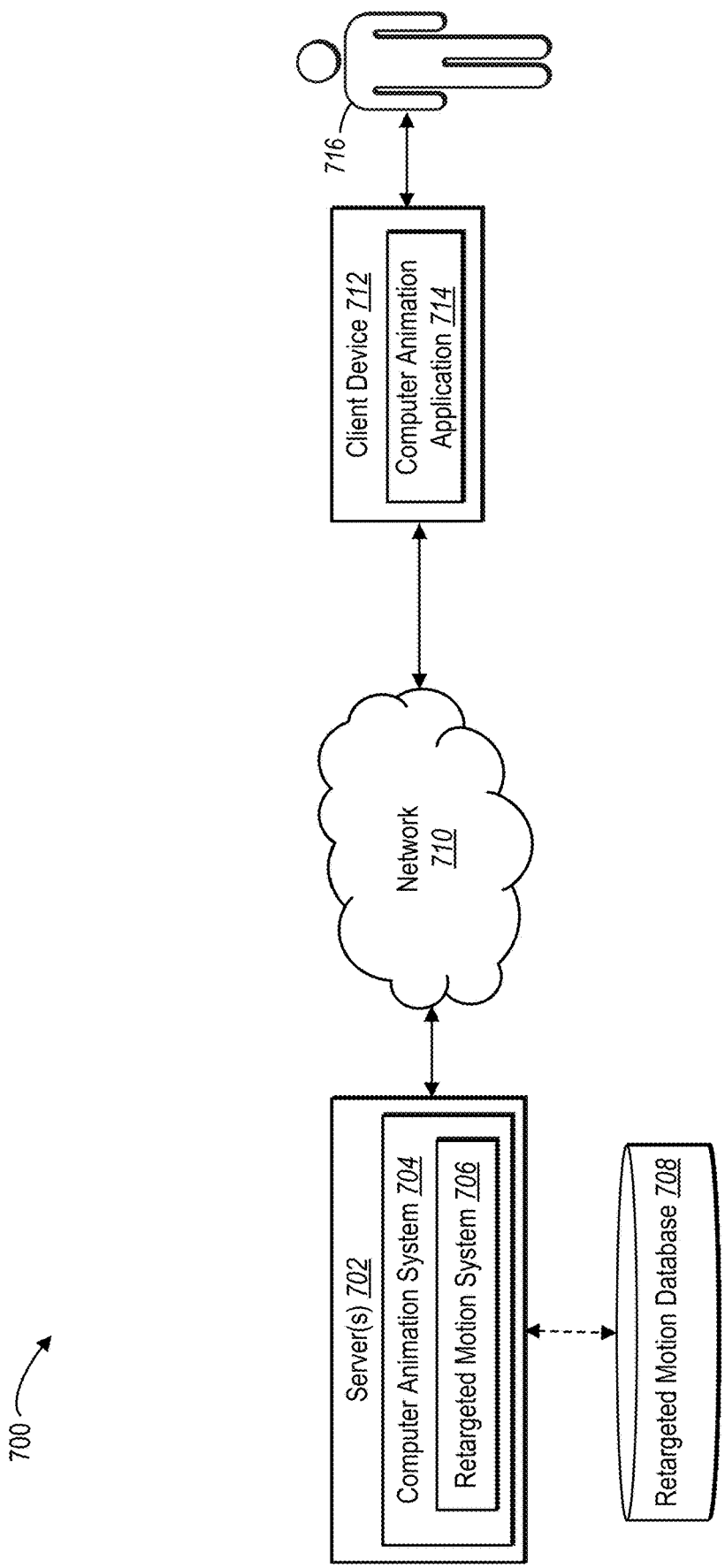
FIG. 7 illustrates a block diagram of an environment in which a retargeted motion system can operate in accordance with one or more embodiments.
Figure 8:
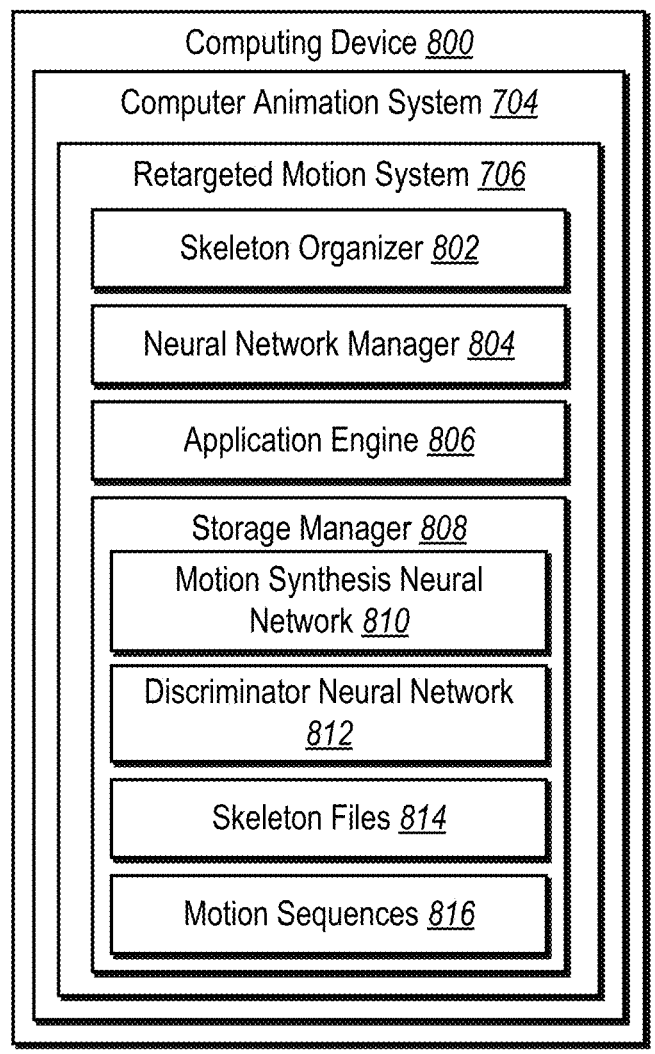
FIG. 8 illustrates a schematic diagram of the retargeted motion system of FIG. 7 in accordance with one or more embodiments.

Turning now to FIGS. 7 and 8, these figures provide an overview of an environment in which a retargeted motion system can operate and an example of an architecture for the retargeted motion system. FIG. 7 is a block diagram illustrating an environment 700 in which the retargeted motion system 706 (i.e., an embodiment the retargeted motion system discussed above) can operate in accordance with one or more embodiments. As illustrated in FIG. 7, the environment 700 includes server(s) 702; a client device 712; a user 716; and a network 710, such as the Internet. The server(s) 702 can host a computer animation system 704 that includes the retargeted motion system 706. In general, the computer animation system 704 facilitates the creation, modification, sharing, accessing, storing, and/or deletion of computer generated images (e.g., digital images for animated objects or digital images for skeletons). As shown in FIG. 7, the computer animation system 704 can also include the retargeted motion system 706.

Although FIG. 7 illustrates an arrangement of the server(s) 702, the client device 712, and the network 710, various additional arrangements are possible. For example, the client device 712 may directly communicate with the server(s) 702 and thereby bypass the network 710. Alternatively, in certain embodiments, the client device 712 includes all or a portion of the retargeted motion system 706. For explanatory purposes, however, this disclosure describes the server(s) 702 as including the retargeted motion system 706.

As further illustrated in FIG. 7, the client device 712 communicates through the network 710 with the retargeted motion system 706 via the server(s) 702. Accordingly, the user 716 can access one or more digital images, motion sequences, skeleton files, or software applications provided (in whole or in part) by the retargeted motion system 706, including to download a computer animation application 714. Additionally, in some embodiments, third party server(s) (not shown) provide data to the server(s) 702 that enable the retargeted motion system 706 to access, download, or upload digital images, motion sequences, skeleton files via the server(s) 702.

As also shown in FIG. 7, in some embodiments, the retargeted motion system 706 accesses, manages, analyzes, and queries data corresponding to digital images, motion sequences, or skeleton files, such as when inputting joint features of a training motion sequence (or motion sequence) into a motion synthesis neural network. For example, the retargeted motion system 706 accesses and analyzes digital images that are stored within a retargeted motion database 708. In some such embodiments, upon accessing a motion sequence, the retargeted motion system 706 inputs joint features of an initial skeleton into the motion synthesis neural network.

To access the functionalities of the retargeted motion system 706, in certain embodiments, the user 716 interacts with the computer animation application 714 on the client device 712. In some embodiments, the computer animation application 714 comprises a web browser, applet, or other software application (e.g., native application) available to the client device 712. Additionally, in some instances, the computer animation application 714 is integrated within an application or webpage. While FIG. 7 illustrates one client device and one user, in alternative embodiments, the environment 700 includes more than the client device 712 and the user 716. For example, in other embodiments, the environment 700 includes hundreds, thousands, millions, or billions of users and corresponding client devices.

In one or more embodiments, the client device 712 transmits data corresponding to digital images, motion sequences, or skeleton files through the network 710 to the retargeted motion system 706, such as when downloading digital images, motion sequences, skeleton files, or software applications or uploading digital images, motion sequences, or skeleton files. To generate the transmitted data or initiate communications, the user 716 interacts with the client device 712. The client device 712 may include, but is not limited to, mobile devices (e.g., smartphones, tablets), laptops, desktops, or any other type of computing device, such as those described below in relation to FIG. 11. Similarly, the network 710 may comprise any of the networks described below in relation to FIG. 11.

For example, in some embodiments, the server(s) 702 receive a motion sequence with an initial skeleton from the client device 712. The server(s) 702 also identify (e.g., receive from the client device 712) a target skeleton (e.g., as part of a target animation character) for generating a target motion sequence that mimics the motion sequence. The server(s) 702 analyze the initial skeleton of the motion sequence to determine positions, velocities, and/or rotations of joints for the initial skeleton over the motion sequence. The server(s) 702 then analyze the motion sequence utilizing a trained motion synthesis neural network (i.e., a motion synthesis neural network trained by providing training input joint features of a training initial skeleton to a motion synthesis neural network, generating predicted joint rotations for a training target skeleton, generating predicted joint features of the training target skeleton, and training the motion synthesis neural network to generate target skeleton motion sequences from initial skeleton motion sequences).

In particular, the server(s) 702 utilize the trained motion synthesis neural network to generate a target motion sequence for the target skeleton that mimics the initial motion sequence. Specifically, the server(s) 702 input initial joint features of an initial skeleton into a motion synthesis neural network, generate predicted joint rotations for a target skeleton, generate predicted joint features of the target skeleton, and render an animated object performing a target motion sequence of the target skeleton corresponding to a motion sequence of the initial skeleton. The server(s) 702 also provide the target motion sequence (e.g., the animated sequence) for display to the client device 712.

As also illustrated in FIG. 7, the computer animation system 704 is communicatively coupled to a retargeted motion database 708. In one or more embodiments, the computer animation system 704 accesses and queries data from the retargeted motion database 708 associated with requests from the retargeted motion system 706. For instance, the computer animation system 704 may access digital images, motion sequences, or skeleton files for the retargeted motion system 706. As shown in FIG. 7, the retargeted motion database 708 is separately maintained from the server(s) 702. Alternatively, in one or more embodiments, the computer animation system 704 and the retargeted motion database 708 comprise a single combined system or subsystem within the server(s) 702.

Turning now to FIG. 8, this figure provides additional detail regarding components and features of the retargeted motion system 706. In particular, FIG. 8 illustrates a computing device 800 implementing the computer animation system 704 and the retargeted motion system 706. In some embodiments, the computing device 800 comprises one or more servers (e.g., the server(s) 702). In other embodiments, the computing device 800 comprises one or more client devices (e.g., the client device 712).

As shown in FIG. 8, the computing device 800 includes the computer animation system 704. In some embodiments, the computer animation system 704 uses its components to render animated objects performing motion sequences. Additionally, in some cases, the computer animation system 704 facilitates the creation, modification, sharing, accessing, storing, and/or deletion of computer generated images (or sequences).

As further shown in FIG. 8, the computing device 800 includes the retargeted motion system 706. The retargeted motion system 706 includes, but is not limited to, a skeleton organizer 802, a neural network manager 804, an application engine 806, and a storage manager 808. The following paragraphs describe each of these components in turn.

The skeleton organizer 802 accesses, searches for, and/or retrieves digital files for initial skeletons and target skeletons. For example, in some embodiments, the skeleton organizer 802 searches for, retrieves, and provides training input joint features of a training initial skeleton to a motion synthesis neural network 810 or a discriminator neural network 812. Similarly, in some implementations, the skeleton organizer 802 searches for, retrieves, and provides joint features of an initial skeleton to the motion synthesis neural network 810. Moreover, in some cases, the skeleton organizer 802 provides predicted joint features of a target skeleton to the application engine 806 for rendering an animated object based on predicted joint features.

As shown in FIG. 8, the computer animation system 704 also includes the neural network manager 804. The neural network manager 804 trains and/or utilizes the motion synthesis neural network 810 and the discriminator neural network 812. For example, in some embodiments, the neural network manager 804 uses the motion synthesis neural network 810 to generate predicted joint rotations for a training target skeleton and to generate predicted joint features of the training target skeleton. Additionally, the neural network manager 804 can train the motion synthesis neural network to generate target skeleton motion sequences from initial skeleton motion sequences. As part of such training, in some implementations, the neural network manager 804 uses the motion synthesis neural network 810 to determine a cycle consistency loss and the discriminator neural network 812 to determine an adversarial loss. The neural network manager 804 further modifies neural network parameters based on one or both of a cycle consistency loss and an adversarial loss.

In addition (or in the alternative to) training the motion synthesis neural network 810 and the discriminator neural network 812, in some embodiments, the neural network manager 804 applies the motion synthesis neural network 810. For example, in some embodiments, the neural network manager 804 uses the motion synthesis neural network 810 to generate predicted joint rotations for a target skeleton and to generate predicted joint features of the target skeleton.

In addition to training and/or applying the motion synthesis neural network 810, in some embodiments, the retargeted motion system 706 also renders animations. As shown in FIG. 8, the application engine 806 renders an animated object performing a target motion sequence of a target skeleton. Consistent with the disclosure above, the target motion sequence corresponds to a motion sequence of an initial skeleton. To render an animated object, the application engine 806 uses or comprises a commercially available or open-source animation software.

As also shown in FIG. 8, the retargeted motion system 706 includes the storage manager 808. In certain embodiments, the storage manager 808 includes non-transitory computer readable media. Among other things, the storage manager 808 maintains the motion synthesis neural network 810, the discriminator neural network 812, skeleton files 814, and/or motion sequences 816. In some embodiments, for example, the motion synthesis neural network 810 comprises a machine learning model that the neural network manager 804 trains or applies. Similarly, in certain implementations, the discriminator neural network 812 comprises a machine learning model that the neural network manager 804 trains. The storage manager 808 maintains the motion synthesis neural network 810 and the discriminator neural network 812 both during and/or after the neural network manager 804 trains the motion synthesis neural network 810 and the discriminator neural network 812.

Additionally, in some embodiments, the data files maintained by the storage manager 808 comprise the skeleton files 814 accessed and retrieved by the skeleton organizer 802. For example, the skeleton files 814 include digital files of reference joint positions for a skeleton, including training initial skeletons, training target skeletons, initial skeletons, and target skeletons. Relatedly, in certain embodiments, the motion sequences 816 include digital files comprising joint features for a motion sequence. For example, in some implementations, the motion sequences 816 includes digital files for training input joint features of a training initial skeleton, predicted joint features of a training target skeleton, joint features of an initial skeleton, and predicted joint features of a target skeleton.

Each of the components 802-816 of the retargeted motion system 706 can include software, hardware, or both. For example, the components 802-816 can include one or more instructions stored on a computer-readable storage medium and executable by processors of one or more computing devices, such as a client device or server device. When executed by the one or more processors, the computer-executable instructions of the retargeted motion system 706 can cause the computing device(s) to perform the feature learning methods described herein. Alternatively, the components 802-816 can include hardware, such as a special-purpose processing device to perform a certain function or group of functions. Alternatively, the components 802-816 of the retargeted motion system 706 can include a combination of computer-executable instructions and hardware.

Furthermore, the components 802-816 of the retargeted motion system 706 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-816 may be implemented as a stand-alone application, such as a desktop or mobile application. Furthermore, the components 802-816 may be implemented as one or more web-based applications hosted on a remote server. The components 802-816 may also be implemented in a suite of mobile device applications or "apps." To illustrate, the components 1002-1014 may be implemented in a software application, including but not limited to ADOBE® CREATIVE CLOUD®, ADOBE® ANIMATE, ADOBE® CHARACTER ANIMATER, ADOBE® AFTER EFFECTS®, ADOBE® PHOTOSHOP®, or ADOBE® LIGHTROOM®. "ADOBE," "CREATIVE CLOUD," "ANIMATE," "CHARACTER ANIMATER," "AFTER EFFECTS," "PHOTOSHOP," and "LIGHTROOM" are either registered trademarks or trademarks of Adobe Systems Incorporated in the United States and/or other countries.

Figure 9:
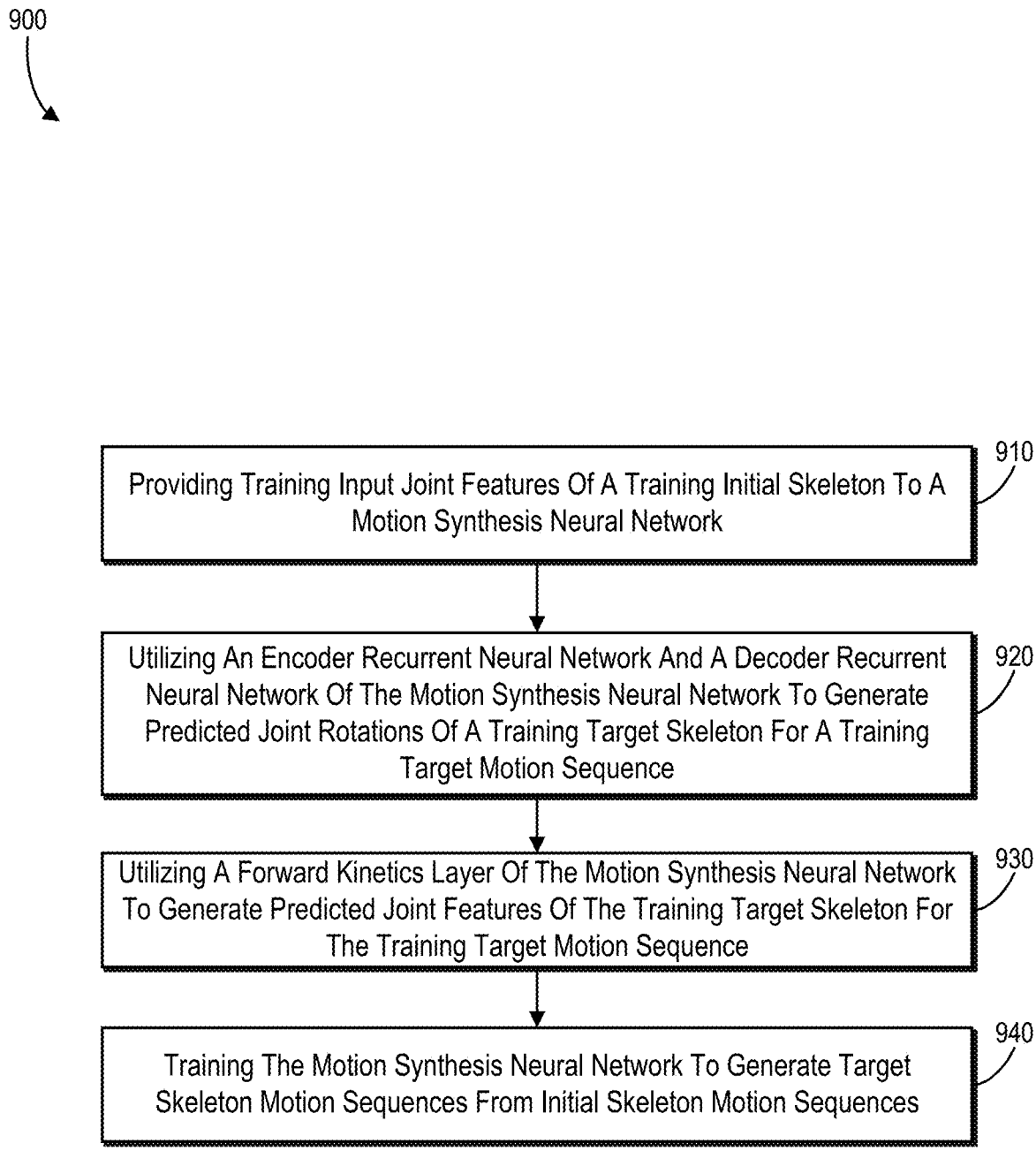
FIG. 9 illustrates a flowchart of a series of acts for training a motion synthesis neural network in accordance with one or more embodiments.

Turning now to FIG. 9, this figure illustrates a flowchart of a series of acts 900 of training a motion synthesis neural network in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer readable storage medium can comprise instructions that, when executed by one or more processors, cause a computing device to perform the acts depicted in FIG. 9. In still further embodiments, a system can perform the acts of FIG. 9.

As shown in FIG. 9, the acts 900 include an act 910 of providing training input joint features of a training initial skeleton to a motion synthesis neural network. For example, in some embodiments, the act 910 includes providing training input joint features for joints of a training initial skeleton to the motion synthesis neural network, wherein the training input joint features correspond to an initial time of a training motion sequence. Relatedly, in some embodiments, the motion synthesis neural network comprises an encoder recurrent neural network, a decoder recurrent neural network, and a forward kinematics layer.

In one or more embodiments, providing training input joint features for the joints of the training initial skeleton to the motion synthesis neural network comprises inputting positions for the joints of the training initial skeleton and global-motion parameters for a root joint of the training initial skeleton into the encoder recurrent neural network.

As further shown in FIG. 9, the acts 900 include an act 920 of utilizing an encoder recurrent neural network and a decoder recurrent neural network of the motion synthesis neural network to generate predicted joint rotations of a training target skeleton for a training target motion sequence. For example, in certain embodiments, the act 920 includes utilizing the encoder recurrent neural network and the decoder recurrent neural network to generate predicted joint rotations for joints of a training target skeleton for an initial time of a training target motion sequence based on the training input joint features.

As suggested above, in one or more embodiments, utilizing the encoder recurrent neural network and the decoder recurrent neural network to generate the predicted joint rotations comprises generating an encoded feature vector for the training input joint features utilizing the encoder recurrent neural network; inputting the encoded feature vector and reference joint positions of the training target skeleton into the decoder recurrent neural network; and generating the predicted joint rotations and a latent feature vector for the training input joint features utilizing the decoder recurrent neural network based on the encoded feature vector and the reference joint positions of the training initial target skeleton.

As further shown in FIG. 9, the acts 900 include an act 930 of utilizing a forward kinematics layer of the motion synthesis neural network to generate predicted joint features of the training target skeleton for the training target motion sequence. For example, in certain implementations, the act 930 includes utilizing the forward kinematics layer to generate predicted joint features for joints of the training target skeleton for the initial time of the training target motion sequence based on the predicted joint rotations.

As suggested above, in some embodiments, utilizing the forward kinematics layer to generate the predicted joint features comprises inputting predicted rotation matrices and reference joint positions of the training target skeleton into the forward kinematics layer; and applying a predicted rotation matrix of the predicted rotation matrices to each joint of the training target skeleton.

As further shown in FIG. 9, the acts 900 include an act 940 of training the motion synthesis neural network to generate target skeleton motion sequences from initial skeleton motion sequences. For example, in some embodiments, the act 940 includes training the motion synthesis neural network to generate target skeleton motion sequences from initial skeleton motion sequences based on the predicted joint features for the joints of the training target skeleton.

As suggested above, in some embodiments, training the motion synthesis neural network comprises providing the predicted joint features of the training target skeleton to a discriminator neural network, wherein the predicted joint features correspond to the initial time of the training target motion sequence; utilizing the discriminator neural network to generate a first realism score for the predicted joint features; and determining an adversarial loss based on the first realism score. Relatedly, in certain embodiments, training the motion synthesis neural network comprises providing the training input joint features of the training initial skeleton to the discriminator neural network, wherein the training input joint features correspond to the initial time of the training motion sequence; utilizing the discriminator neural network to generate a second realism score for the training input joint features; and determining the adversarial loss based on the first realism score and the second realism score.

Moreover, in one or more embodiments, training the motion synthesis neural network comprises modifying parameters of the motion synthesis neural network based on a first objective to increase the adversarial loss; and modifying parameters of the discriminator neural network based on a second objective to decrease the adversarial loss.

Additionally, or alternatively, in some embodiments, training the motion synthesis neural network comprises providing the predicted joint features of the training target skeleton to the motion synthesis neural network, wherein the predicted joint features correspond to the initial time of the training target motion sequence; utilizing the motion synthesis neural network to generate consistency joint features for the joints of the training initial skeleton for the initial time of the training motion sequence; and determining a cycle consistency loss by comparing the consistency joint features for the joints of the training initial skeleton with the training input joint features for the joints of the training initial skeleton. Relatedly, in some implementations, training the motion synthesis neural network comprises modifying parameters of the motion synthesis neural network based on the cycle consistency loss.

In addition to the acts 910-940, in some embodiments, the acts 900 further include generating an encoded feature vector for the training input joint features utilizing the encoder recurrent neural network; inputting the encoded feature vector and reference joint positions of the training target skeleton into the decoder recurrent neural network; and generating the predicted joint rotations and a latent feature vector for the training input joint features utilizing the decoder recurrent neural network based on the encoded feature vector and the reference joint positions of the target skeleton.

Additionally, in certain embodiments, the acts 900 further include providing subsequent training input joint features for the joints of the training initial skeleton for a subsequent time of the training motion sequence to the motion synthesis neural network; and utilizing the encoder recurrent neural network and the decoder recurrent neural network to generate subsequent predicted joint rotations for joints of the training target skeleton for a subsequent time of the training target motion sequence based on the subsequent training input joint features; and utilizing the forward kinematics layer to generate subsequent predicted joint features for the joints of the training target skeleton for the subsequent time of the training target motion sequence based on the subsequent predicted joint rotations. Moreover, in some embodiments, the acts 900 further include providing the encoded feature vectors for the training input joint features to the motion synthesis neural network.

Relatedly, in some embodiments, providing the subsequent training input joint features for the joints of the training initial skeleton and the encoded feature vector for the training input joint features into the motion synthesis neural network by inputting subsequent positions for the joints of the training initial skeleton, a subsequent velocity of the root joint of the initial skeleton, a subsequent rotation of the root joint of the training initial skeleton, and the encoded feature vector for the training input joint features into the encoder recurrent neural network.

As suggested above, in one or more embodiments, training the motion synthesis neural network comprises generating a subsequent adversarial loss utilizing a discriminator neural network based on the subsequent predicted joint features and the subsequent training input joint features; utilizing the motion synthesis neural network to generate subsequent consistency joint features for the joints of the training initial skeleton for the subsequent time of the training motion sequence; generating a subsequent cycle consistency loss based on the subsequent training input joint features and the subsequent consistency joint features; and modifying parameters of the motion synthesis neural network based on the subsequent adversarial loss and the subsequent cycle consistency loss.

Moreover, in certain implementations, utilizing the encoder recurrent neural network and the decoder recurrent neural network to generate the subsequent predicted joint rotations for the joints of the training target skeleton comprises generating a subsequent encoded feature vector for the subsequent training input joint features utilizing the encoder recurrent neural network; and generating the subsequent predicted joint rotations utilizing the decoder recurrent neural network based on the subsequent encoded feature vector, the predicted joint features for joints of the training target skeleton for the initial time of the training target motion sequence, the reference joint positions of the training target skeleton, and the latent feature vector for the training input joint features.

In addition (or in the alternative) to the acts describe above, in some embodiments the acts 900 include a step for training a motion synthesis neural network to generate training target motion sequences for training target skeletons from training motion sequences of training initial skeletons. The algorithms and acts described in reference to FIG. 4 comprise the corresponding structure for a step for training a motion synthesis neural network to generate training target motion sequences for training target skeletons from training motion sequences of training initial skeletons.

Figure 10:
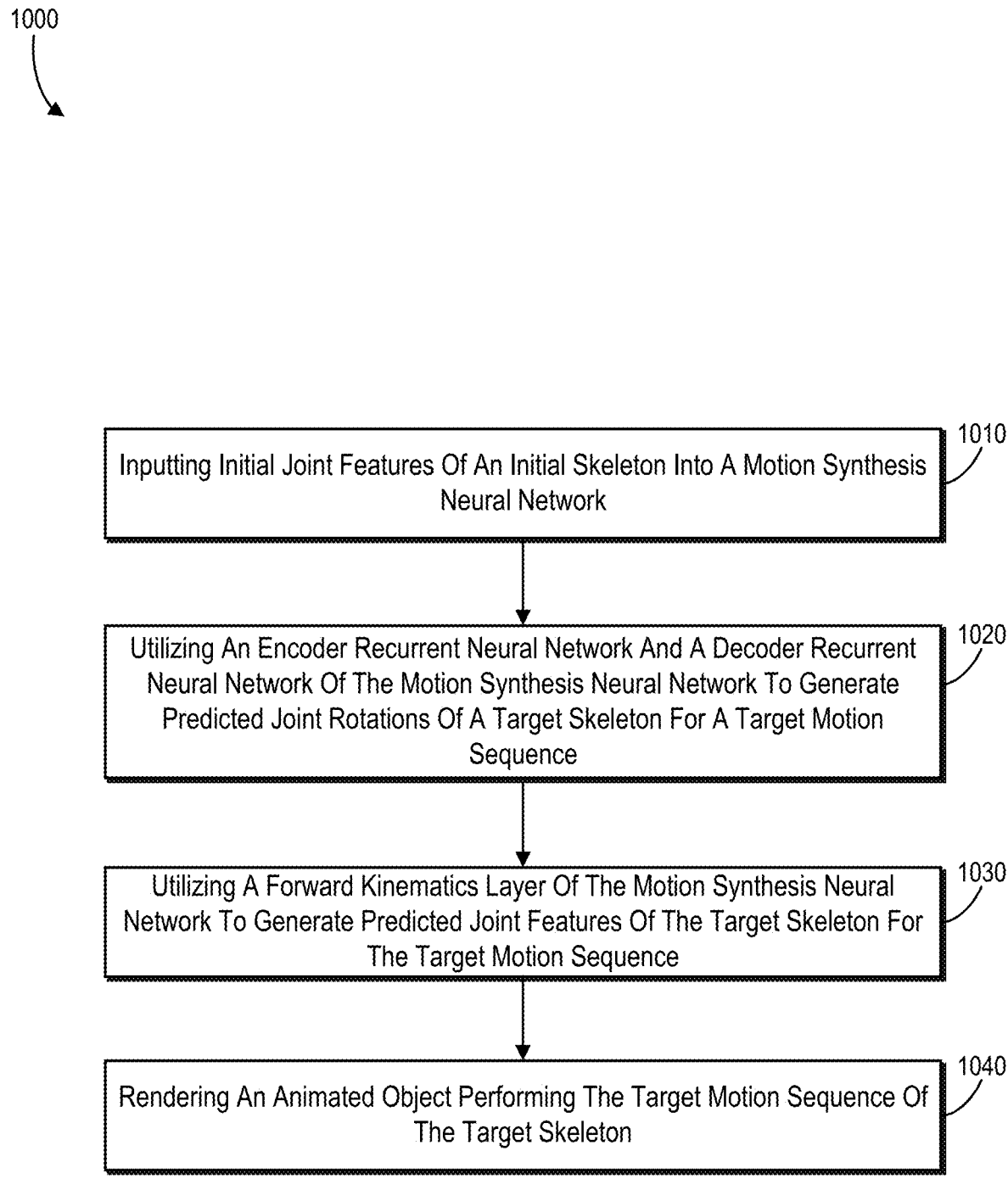
FIG. 10 illustrates a flowchart of a series of acts for applying a motion synthesis neural network in accordance with one or more embodiments.

Turning now to FIG. 10, this figure illustrates a flowchart of a series of acts 1000 of applying a motion synthesis neural network in accordance with one or more embodiments. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer readable storage medium can comprise instructions that, when executed by one or more processors, cause a computing device to perform the acts depicted in FIG. 10. In still further embodiments, a system can perform the acts of FIG. 10.

As shown in FIG. 10, the acts 1000 include an act 1010 of inputting initial joint features of an initial skeleton into a motion synthesis neural network. For example, in some embodiments, the act 1010 includes inputting initial joint features for joints of an initial skeleton into a motion synthesis neural network, wherein the initial joint features correspond to an initial time of a motion sequence and the motion synthesis neural network comprise an encoder recurrent neural network, a decoder recurrent neural network, and a forward kinematics layer.

In one or more embodiments, inputting the initial joint features for the joints of the initial skeleton into the motion synthesis neural network comprises inputting positions for the joints of the initial skeleton, a velocity of a root joint of the initial skeleton, and a rotation of the root joint of the initial skeleton into the encoder recurrent neural network.

As further shown in FIG. 10, the acts 1000 include an act 1020 of utilizing an encoder recurrent neural network and a decoder recurrent neural network of the motion synthesis neural network to generate predicted joint rotations of a target skeleton for a target motion sequence. For example, in certain embodiments, the act 1020 includes utilizing the encoder recurrent neural network and the decoder recurrent neural network to generate predicted joint rotations for joints of a target skeleton for an initial time of a target motion sequence based on the initial joint features. Moreover, in some embodiments, a segment in between joints of the initial skeleton differs in length and proportion from a corresponding segment in between joints of the target skeleton.

As suggested above, in one or more embodiments, utilizing the encoder recurrent neural network and the decoder recurrent neural network to generate the predicted joint rotations comprises generating an encoded feature vector for the initial joint features utilizing the encoder recurrent neural network; inputting the encoded feature vector and reference joint positions of the target skeleton into the decoder recurrent neural network; and generating the predicted joint rotations and a latent feature vector for the initial joint features utilizing the decoder recurrent neural network based on the encoded feature vector and the reference joint positions of the target skeleton.

As further shown in FIG. 10, the acts 1000 include an act 1030 of utilizing a forward kinematics layer of the motion synthesis neural network to generate predicted joint features of the target skeleton for the target motion sequence. For example, in certain implementations, the act 1030 includes utilizing the forward kinematics layer to generate predicted joint features for joints of the target skeleton for the initial time of the target motion sequence based on the predicted joint rotations, the target motion sequence of the target skeleton corresponding to the motion sequence of the initial skeleton. Moreover, in certain embodiments, the target motion sequence comprises different predicted-joint-feature sets for a joint of the joints of the target skeleton at different times within the target motion sequence.

As suggested above, in some embodiments, utilizing the forward kinematics layer to generate the predicted joint features comprises inputting predicted rotation matrices and reference joint positions of the target skeleton into the forward kinematics layer; and applying a predicted rotation matrix of the predicted rotation matrices to each joint of the target skeleton.

As further shown in FIG. 10, the acts 1000 include an act 1040 of rendering an animated object performing the target motion sequence of the target skeleton. For example, in some embodiments, the act 1040 includes, based on the predicted joint features, rendering an animated object performing the target motion sequence of the target skeleton corresponding to the motion sequence of the initial skeleton.

In addition to the acts 1010-1040, in some embodiments, the acts 1000 further include inputting subsequent joint features for the joints of the initial skeleton and the encoded feature vector for the initial joint features into the motion synthesis neural network, wherein the subsequent joint features correspond to a subsequent time of the motion sequence; utilizing the encoder recurrent neural network and the decoder recurrent neural network to generate subsequent predicted joint rotations for the joints of the target skeleton based on the subsequent joint features and the encoded feature vector for the initial joint features; and utilizing the forward kinematics layer to generate subsequent predicted joint features for joints of the target skeleton for the subsequent time of the motion sequence based on the subsequent predicted joint rotations, wherein the subsequent predicted joint features for joints of the target skeleton reflect the subsequent joint features for the joints of the initial skeleton.

Relatedly, in certain implementations, inputting the subsequent joint features for the joints of the initial skeleton and the encoded feature vector for the initial joint features into the motion synthesis neural network comprises inputting subsequent positions for the joints of the initial skeleton, a subsequent velocity of the root joint of the initial skeleton, a subsequent rotation of the root joint of the initial skeleton, and the encoded feature vector for the initial joint features into the encoder recurrent neural network.

Additionally, in certain embodiments, utilizing the encoder recurrent neural network and the decoder recurrent neural network to generate the subsequent predicted joint rotations for the joints of the target skeleton comprises: generating a subsequent encoded feature vector for the subsequent joint features utilizing the encoder recurrent neural network; and generating the subsequent predicted joint rotations utilizing the decoder recurrent neural network based on the subsequent encoded feature vector, the predicted joint features for joints of the target skeleton for the initial time of the target motion sequence, the reference joint positions of the target skeleton, and the latent feature vector for the initial joint features.

As suggested above, in one or more embodiments, the target motion sequence performed by the animated object comprises both the predicted joint features and the subsequent predicted joint features.

In addition (or in the alternative) to the acts describe above, in some embodiments the acts 1000 include a step for generating a target motion sequence for joints of a target skeleton based on an initial motion sequence for joints of an initial skeleton using the trained motion synthesis neural network. The algorithms and acts described in reference to FIG. 5 comprise the corresponding acts for a step for generating a target motion sequence for joints of a target skeleton based on an initial motion sequence for joints of an initial skeleton using the trained motion synthesis neural network.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 11:
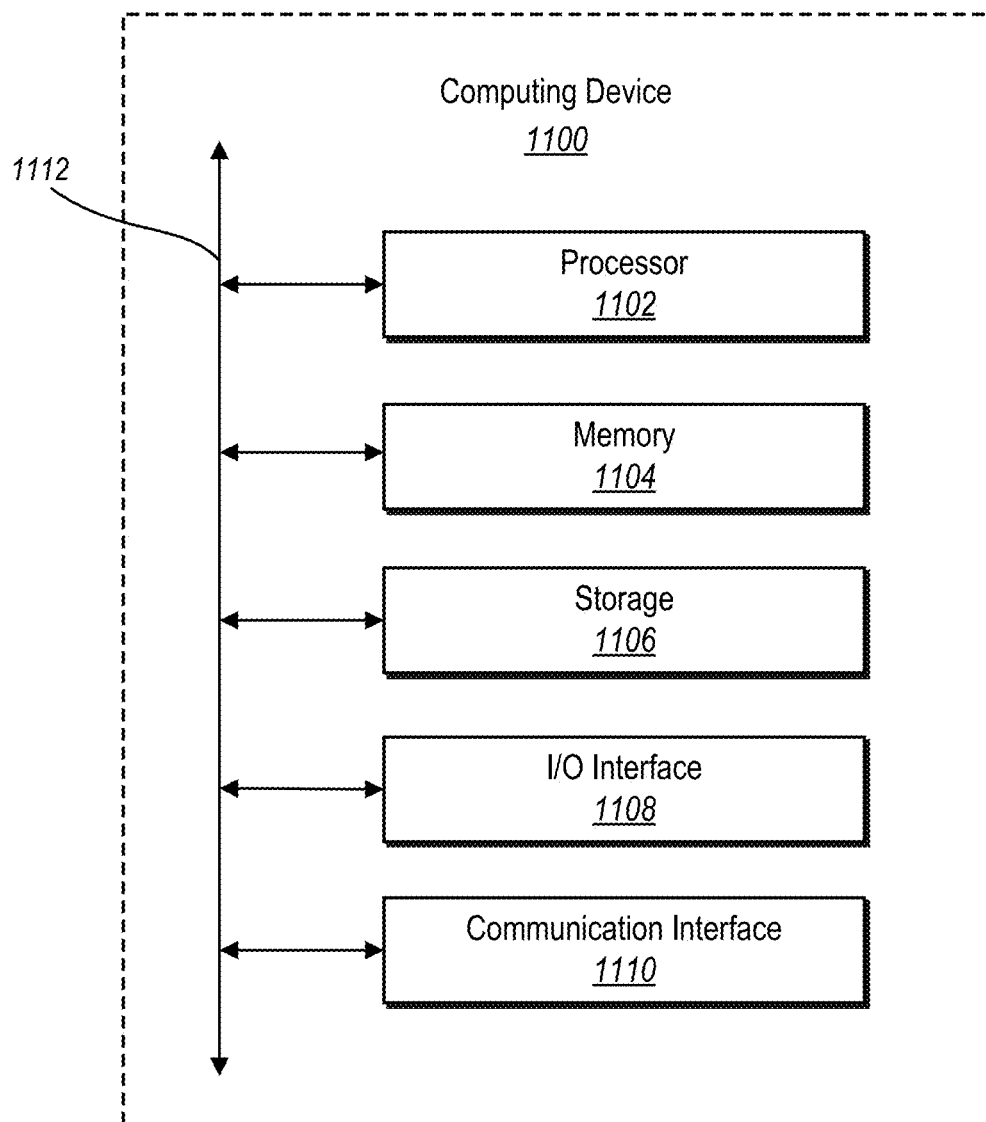
FIG. 11 illustrates a block diagram of an exemplary computing device for implementing one or more embodiments of the present disclosure.

FIG. 11 illustrates a block diagram of exemplary computing device 1100 that may be configured to perform one or more of the processes described above. As shown by FIG. 11, the computing device 1100 can comprise a processor 1102, a memory 1104, a storage device 1106, an I/O interface 1108, and a communication interface 1110, which may be communicatively coupled by way of a communication infrastructure 1112. In certain embodiments, the computing device 1100 can include fewer or more components than those shown in FIG. 11. Components of the computing device 1100 shown in FIG. 11 will now be described in additional detail.

In one or more embodiments, the processor 1102 includes hardware for executing instructions, such as those making up a computer program. As an example, and not by way of limitation, to execute instructions for digitizing real-world objects, the processor 1102 may retrieve (or fetch) the instructions from an internal register, an internal cache, the memory 1104, or the storage device 1106 and decode and execute them. The memory 1104 may be a volatile or non-volatile memory used for storing data, metadata, and programs for execution by the processor(s). The storage device 1106 includes storage, such as a hard disk, flash disk drive, or other digital storage device, for storing data or instructions related to object digitizing processes (e.g., digital scans, digital models).

The I/O interface 1108 allows a user to provide input to, receive output from, and otherwise transfer data to and receive data from computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example and not by way of limitation, the communication interface 1110 may include a network interface controller ("NIC") or network adapter for communicating with an Ethernet or other wire-based network or a wireless NIC ("WNIC") or wireless adapter for communicating with a wireless network, such as a WI-FI.

Additionally, the communication interface 1110 may facilitate communications with various types of wired or wireless networks. The communication interface 1110 may also facilitate communications using various communication protocols. The communication infrastructure 1112 may also include hardware, software, or both that couples components of the computing device 1100 to each other. For example, the communication interface 1110 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

We claim:

1. A non-transitory computer readable medium storing instructions thereon that, when executed by at least one processor, cause a computing device to:
    input initial joint features for joints of an initial skeleton into a motion synthesis neural network, wherein the initial joint features correspond to an initial time of a motion sequence and the motion synthesis neural network comprises an encoder recurrent neural network, a decoder recurrent neural network, and a forward kinematics layer;
    utilize the encoder recurrent neural network and the decoder recurrent neural network to generate predicted joint rotations for joints of a target skeleton differing from the initial skeleton for an initial time of a target motion sequence based on the initial joint features, wherein the target skeleton comprises a segment between a pair of joints differing in length from a corresponding segment in the initial skeleton;
    utilize the forward kinematics layer to generate predicted joint features for joints of the target skeleton for the initial time of the target motion sequence based on the predicted joint rotations, the target motion sequence of the target skeleton corresponding to the motion sequence of the initial skeleton; and
    based on the predicted joint features, render an animated object performing the target motion sequence of the target skeleton corresponding to the motion sequence of the initial skeleton.

2. The non-transitory computer readable medium of claim 1, further comprising instructions that, when executed by the at least one processor, cause the computing device to input the initial joint features for the joints of the initial skeleton into the motion synthesis neural network by inputting positions for the joints of the initial skeleton, a velocity of a root joint of the initial skeleton, and a rotation of the root joint of the initial skeleton into the encoder recurrent neural network.

3. The non-transitory computer readable medium of claim 1, further comprising instructions that, when executed by the at least one processor, cause the computing device to utilize the forward kinematics layer to generate the predicted joint features by:
    inputting predicted rotation matrices and reference joint positions of the target skeleton into the forward kinematics layer; and
    applying a predicted rotation matrix of the predicted rotation matrices to each joint of the target skeleton.

4. The non-transitory computer readable medium of claim 1, further comprising instructions that, when executed by the at least one processor, cause the computing device to:
    generate an encoded feature vector for the initial joint features utilizing the encoder recurrent neural network;
    input the encoded feature vector and reference joint positions of the target skeleton into the decoder recurrent neural network; and
    generate the predicted joint rotations and a latent feature vector for the initial joint features utilizing the decoder recurrent neural network based on the encoded feature vector and the reference joint positions of the target skeleton.

5. The non-transitory computer readable medium of claim 4, further comprising instructions that, when executed by the at least one processor, cause the computing device to:
    input subsequent joint features for the joints of the initial skeleton and the encoded feature vector for the initial joint features into the motion synthesis neural network, wherein the subsequent joint features correspond to a subsequent time of the motion sequence;
    utilize the encoder recurrent neural network and the decoder recurrent neural network to generate subsequent predicted joint rotations for the joints of the target skeleton based on the subsequent joint features and the encoded feature vector for the initial joint features; and
    utilize the forward kinematics layer to generate subsequent predicted joint features for joints of the target skeleton for the subsequent time of the motion sequence based on the subsequent predicted joint rotations, wherein the subsequent predicted joint features for joints of the target skeleton reflect the subsequent joint features for the joints of the initial skeleton.

6. The non-transitory computer readable medium of claim 5, further comprising instructions that, when executed by the at least one processor, cause the computing device to input the subsequent joint features for the joints of the initial skeleton and the encoded feature vector for the initial joint features into the motion synthesis neural network by inputting subsequent positions for the joints of the initial skeleton, a subsequent velocity of a root joint of the initial skeleton, a subsequent rotation of the root joint of the initial skeleton, and the encoded feature vector for the initial joint features into the encoder recurrent neural network.

7. The non-transitory computer readable medium of claim 5, further comprising instructions that, when executed by the at least one processor, cause the computing device to utilize the encoder recurrent neural network and the decoder recurrent neural network to generate the subsequent predicted joint rotations for the joints of the target skeleton by:

generating a subsequent encoded feature vector for the subsequent joint features utilizing the encoder recurrent neural network; and generating the subsequent predicted joint rotations utilizing the decoder recurrent neural network based on the subsequent encoded feature vector, the predicted joint features for joints of the target skeleton for the initial time of the target motion sequence, the reference joint positions of the target skeleton, and the latent feature vector for the initial joint features.

8. The non-transitory computer readable medium of claim 5, wherein the target motion sequence performed by the animated object comprises both the predicted joint features and the subsequent predicted joint features.

9. A system for training motion synthesis neural networks to generate retargeted skeleton motion sequences that reflect motion sequences of initial skeletons comprising:
at least one processor;
at least one non-transitory computer memory comprising a motion synthesis neural network that includes an encoder recurrent neural network, a decoder recurrent neural network, and a forward kinematics layer; and
instructions that, when executed by at least one processor, cause the system to:
provide training input joint features for joints of a training initial skeleton to the motion synthesis neural network, wherein the training input joint features correspond to an initial time of a training motion sequence;
utilize the encoder recurrent neural network and the decoder recurrent neural network to generate predicted joint rotations for joints of a training target skeleton differing from the training initial skeleton for an initial time of a training target motion sequence based on the training input joint features, wherein the training target skeleton comprises a segment between a pair of joints differing in length from a corresponding segment in the training initial skeleton;
utilize the forward kinematics layer to generate predicted joint features for joints of the training target skeleton for the initial time of the training target motion sequence based on the predicted joint rotations; and
train the motion synthesis neural network to generate target skeleton motion sequences from initial skeleton motion sequences based on the predicted joint features for the joints of the training target skeleton.

10. The system of claim 9, further comprising instructions that, when executed by the at least one processor, cause the system to train the motion synthesis neural network by:
providing the predicted joint features of the training target skeleton to a discriminator neural network, wherein the predicted joint features correspond to the initial time of the training target motion sequence;
utilizing the discriminator neural network to generate a first realism score for the predicted joint features; and
determining an adversarial loss based on the first realism score.

11. The system of claim 10, further comprising instructions that, when executed by the at least one processor, cause the system to train the motion synthesis neural network by:
providing the training input joint features of the training initial skeleton to the discriminator neural network, wherein the training input joint features correspond to the initial time of the training motion sequence;
utilizing the discriminator neural network to generate a second realism score for the training input joint features; and
determining the adversarial loss based on the first realism score and the second realism score.

12. The system of claim 10, further comprising instructions that, when executed by the at least one processor, cause the system to train the motion synthesis neural network by:
modifying parameters of the motion synthesis neural network based on a first objective to increase the adversarial loss; and
modifying parameters of the discriminator neural network based on a second objective to decrease the adversarial loss.

13. The system of claim 9, further comprising instructions that, when executed by the at least one processor, cause the system to train the motion synthesis neural network by:
providing the predicted joint features of the training target skeleton to the motion synthesis neural network, wherein the predicted joint features correspond to the initial time of the training target motion sequence;
utilizing the motion synthesis neural network to generate consistency joint features for the joints of the training initial skeleton for the initial time of the training motion sequence; and
determining a cycle consistency loss by comparing the consistency joint features for the joints of the training initial skeleton with the training input joint features for the joints of the training initial skeleton.

14. The system of claim 13, further comprising instructions that, when executed by the at least one processor, cause the system to train the motion synthesis neural network by modifying parameters of the motion synthesis neural network based on the cycle consistency loss.

15. The system of claim 9, further comprising instructions that, when executed by the at least one processor, cause the system to:
generate an encoded feature vector for the training input joint features utilizing the encoder recurrent neural network;
input the encoded feature vector and reference joint positions of the training target skeleton into the decoder recurrent neural network; and
generate the predicted joint rotations and a latent feature vector for the training input joint features utilizing the decoder recurrent neural network based on the encoded feature vector and the reference joint positions of the target skeleton.

16. The system of claim 9, further comprising instructions that, when executed by the at least one processor, cause the system to:
provide subsequent training input joint features for the joints of the training initial skeleton for a subsequent time of the training motion sequence to the motion synthesis neural network; and
utilize the encoder recurrent neural network and the decoder recurrent neural network to generate subsequent predicted joint rotations for joints of the training target skeleton for a subsequent time of the training target motion sequence based on the subsequent training input joint features; and
utilize the forward kinematics layer to generate subsequent predicted joint features for the joints of the training target skeleton for the subsequent time of the training target motion sequence based on the subsequent predicted joint rotations.

17. The system of claim 16, further comprising instructions that, when executed by the at least one processor, cause the system to train the motion synthesis neural network by:
- generating a subsequent adversarial loss utilizing a discriminator neural network based on the subsequent predicted joint features and the subsequent training input joint features;
- utilizing the motion synthesis neural network to generate subsequent consistency joint features for the joints of the training initial skeleton for the subsequent time of the training motion sequence;
- generating a subsequent cycle consistency loss based on the subsequent training input joint features and the subsequent consistency joint features; and
- modifying parameters of the motion synthesis neural network based on the subsequent adversarial loss and the subsequent cycle consistency loss.

18. A method for training and applying motion synthesis neural networks comprising:
- performing a step for training a motion synthesis neural network to generate training target motion sequences for training target skeletons from training motion sequences of training initial skeletons;
- performing a step for generating a target motion sequence for joints of a target skeleton based on an initial motion sequence for joints of an initial skeleton using the trained motion synthesis neural network; and
- rendering an animated object performing the target motion sequence for the joints of the target skeleton.

19. The method of claim 18, wherein the target motion sequence comprises different predicted-joint-feature sets for a joint of the joints of the target skeleton at different times within the target motion sequence.

20. The method of claim 18, wherein a segment in between a pair of joints of the initial skeleton differs in length and proportion from a corresponding segment in between a pair of joints of the target skeleton.

* * * * *